United States Patent
Maruyama et al.

(10) Patent No.: US 7,434,017 B2
(45) Date of Patent: Oct. 7, 2008

(54) STORAGE SYSTEM WITH VIRTUAL ALLOCATION AND VIRTUAL RELOCATION OF VOLUMES

(75) Inventors: Tetsuya Maruyama, Yokohama (JP); Yoshiaki Eguchi, Yokohama (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 245 days.

(21) Appl. No.: 11/441,463

(22) Filed: May 24, 2006

(65) Prior Publication Data
US 2007/0233987 A1    Oct. 4, 2007

(30) Foreign Application Priority Data
Apr. 3, 2006    (JP)    .............................. 2006-102376

(51) Int. Cl.
*G06F 12/00*    (2006.01)
(52) U.S. Cl. ....................... 711/165; 711/114
(58) Field of Classification Search ........................ None
See application file for complete search history.

(56) References Cited

U.S. PATENT DOCUMENTS

| | | | |
|---|---|---|---|
| 6,857,059 B2 * | 2/2005 | Karpoff et al. ............... | 711/209 |
| 7,096,338 B2 * | 8/2006 | Takahashi et al. ............ | 711/165 |
| 7,343,465 B2 | 3/2008 | Shibayama et al. | |
| 2006/0047909 A1 * | 3/2006 | Takahashi et al. ............ | 711/114 |
| 2006/0047930 A1 | 3/2006 | Takahashi et al. | |
| 2006/0143418 A1 | 6/2006 | Takahashi et al. | |
| 2008/0091898 A1 * | 4/2008 | Takahashi et al. ............ | 711/162 |

FOREIGN PATENT DOCUMENTS

| | | |
|---|---|---|
| JP | 2001-067187 | 3/2001 |
| JP | 2003-140836 | 5/2003 |

* cited by examiner

*Primary Examiner*—Kevin Verbrugge
(74) *Attorney, Agent, or Firm*—Townsend and Townsend and Crew LLP

(57) ABSTRACT

When a volume belonging to a first storage tier is relocated to a second storage tier, in the event that an empty volume satisfying capacity conditions is not present in the second storage tier, an empty volume satisfying the capacity conditions within volumes belonging to a third storage tier is virtually allocated to the second storage tier, a further virtual empty volume is formed, and the volume is virtually relocated to the further virtual empty volume.

20 Claims, 31 Drawing Sheets

STORAGE TIER 1

VIRTUAL RELOCATION

STORAGE TIER 2

RELOCATION

STORAGE TIER 3

STORAGE TIER 1

RELOCATION

STORAGE TIER 2

VIRTUAL RELOCATION

STORAGE TIER 3

FIG.17

VOLUME TABLE 421

| ID | STORAGE ID | VOL# | RAID LEVEL | DISC TYPE | CAPACITY | USAGE STATE | ASSIGNED TIER |
|---|---|---|---|---|---|---|---|
| 001 | 001 | 01 | RAID1 | FC | 100GB | PVOL | 001 |
| 002 | 001 | 02 | RAID5 | FC | 100GB | EMPTY | 001 |
| 003 | 002 | 01 | RAID5 | SATA | 100GB | SVOL | 003 |
| 801 | 802 | 803 | 804 | 805 | 806 | 807 | 808 |

FIG.18

STORAGE TIER TABLE 422

| ID | TIER NAME | TIER CONDITIONS | | | | |
|---|---|---|---|---|---|---|
| | | CAPACITY | TIER ID | APPARATUS TYPE | RAID LEVEL | DISC TYPE |
| 001 | HIGH PERFORMANCE | ≧10GB | — | XXX | RAID1 | FC |
| 002 | MID-PERFORMANCE | ≧10GB | — | YYY | — | FC |
| 003 | STORAGE USE | >5GB | 002 | — | RAID5 | SATA |
| 901 | 902 | 903 | 904 | 905 | 906 | 907 |

STORAGE TABLE

| ID | STORAGE NAME | APPARATUS TYPE |
|---|---|---|
| 001 | Storage-A | XXX |
| 002 | Storage-B | YYY |
| 003 | Storage-C | ZZZ |

TIER TRANSFER INFORMATION TABLE

| ID | VOL-ID | VIRTUAL ALLOCATION SOURCE TIER | VIRTUAL ALLOCATION DESTINATION TIER | TRANSFER TIME OF DAY | OPERATION |
|---|---|---|---|---|---|
| 001 | 010 | 003 | 002 | 2005/12/10 10:00 | RELOCATION |
| 002 | 033 | 001 | 002 | 2005/12/12 0:00 | REPLICATION |

VOLUME TABLE

| VOL-ID | VDEV-ID | Port-ID | RAID LEVEL | DISC TYPE | CAPACITY | USAGE STATE |
|--------|---------|---------|------------|-----------|----------|-------------|
| 01 | 001 | 01 | RAID1 | FC | 100GB | IN USE |
| 02 | 002 | 02 | RAID5 | FC | 100GB | EMPTY |
| 03 | 005 | 02 | RAID5 | FC | 100GB | SVOL |

EXTERNAL VOLUME TABLE

| VOL-ID | EXTERNAL Port ID | IP ADDRESS | EXTERNAL VOL-ID |
|--------|------------------|------------|-----------------|
| 101 | 11 | 10.209.xxx.xxx | 01 |
| 102 | 11 | 10.209.xxx.xxx | 02 |
| 103 | 12 | 200.51.xxx.yyy | 01 |

| TIER NAME: | HIGH TIER | | |
|---|---|---|---|
| CAPACITY OR MORE: | 100GB | NONE ▼ | AND ▼ |
| APPARATUS NAME: | | | NO ▼ |
| APPARATUS TYPE: | | | AND ▼ |
| RAID LEVEL: | RAID1 ▼ | | AND ▼ |
| DISC TYPE: | FC ▼ | | AND ▼ |

CONFIRM    CANCEL

| SELECTION | Vol-ID | SOURCE TIER | CURRENT TIER | TIME OF DAY | OPERATION |
|---|---|---|---|---|---|
| ○ | 010 | 003 | 002 | 2005/12/11 10:00 | RELOCATION |
| ◎ | 033 | 001 | 002 | 2005/12/12 0:00 | REPLICATION |

CONFIRM    CANCEL

FIG.36

VIRTUAL ALLOCATION TABLE 2101

| ID | VOL-ID | TRANSFER DESTINATION | VIRTUAL TRANSFER DESTINATION | TRANSFER TIME OF DAY | OPERATION |
|---|---|---|---|---|---|
| 001 | 010 | 003 | 010 | 2005/12/10 10:00 | RELOCATION |
| 002 | 033 | 001 | 005 | 2005/12/12 0:00 | REPLICATION |
| 2201 | 2202 | 2203 | 2204 | 2205 | 2206 |

STORAGE SYSTEM WITH VIRTUAL ALLOCATION AND VIRTUAL RELOCATION OF VOLUMES

CROSS-REFERENCES TO RELATED APPLICATIONS

This application relates to and claims priority from Japanese Patent Application No. 2006-102376, filed on Apr. 3, 2006, the entire disclosure of which is incorporated herein by reference.

BACKGROUND

1. Field of the Invention

The present invention relates to a storage system, and particularly relates to volume relocation technology and replication technology.

2. Description of Related Art

Data handled by storage systems managed by business organizations, local authorities, public offices, financial institutions etc. increases year by year on the one hand, while new storage apparatus are added to or exchanged with existing storage apparatus in accompaniment with increase in the amount of data. When a plurality of storage apparatus are added to a storage system in accompaniment with an increase in the amount of data to be managed, configuration of the storage system becomes complex. Virtualization of a storage system is well-known as technology for resolving this kind of problem. Virtualization of the storage system is technology where a plurality of storage apparatus mutually connected to a network are virtualized logically as a single storage system. By virtualizing the storage system, operations management can also be handled jointly as one, and this may contribute towards a reduction in management costs.

By applying storage system virtualization technology, it is possible to classify volumes of a storage system into a plurality of storage tiers taking characteristics such as performance and type etc. as conditions. In Japanese Patent Laid-open Publication No. 2001-47187 and Japanese Patent Laid-open Publication No. 2003-140836, technology is disclosed for arranging this data into optimum storage tiers based on type and data and time of creation etc. of data stored in each volume. For example, in Japanese Patent Laid-open Publication No. 2001-67187, technology is disclosed where data stored in one volume is copied to another volume based on performance information and utilization information for each volume, with the data then being re-arranged.

SUMMARY

However, with the technology disclosed in Japanese Patent Laid-open Publication No. 2001-67187, it is necessary to relocate data every volume, and the operation is therefore complex.

On the other hand, with the technology disclosed in Japanese Patent Laid-open Publication No. 2003-140836, in the event that there is not sufficient space in the storage tier selected as the destination for relocation, relocation takes place while selecting regions, of regions classified to this class, that are of a low usage rate without conditions and data may then be relocated at a storage tier (for example, a storage tier of lower performance) without the knowledge of the administrator.

It is therefore an object of the present invention to provide a storage system capable of appropriately executing relocation or replication of a volume even in cases where there is no space in the storage tier specified as the transfer destination or replication destination for the empty volume.

It is therefore another object of the present invention to provide a storage system capable of appropriately executing relocation or replication of a volume even in cases where a volume specified as the transfer destination or replication destination for the volume is not an empty volume.

In order to resolve the aforementioned problems, the storage system of the present invention is a storage system having storage resources comprised of a plurality of storage tiers, each containing one or more volumes. This system comprises a virtual allocation section for virtually allocating a third volume satisfying transfer requirement conditions of volumes belonging to a third storage tier to a second storage tier in the event that a second volume satisfying the transfer requirement conditions that is a transfer destination of a first volume does not exist in the second storage tier when relocating the first volume belonging to a first storage tier to the second storage tier, and a relocation section for relocating the first volume to the third volume.

According to this configuration, volume relocation can be appropriately executed even when an empty volume does not exist in a storage tier designated as a transfer destination of a volume.

Here, the relocation section relocates the third volume to the second volume when a volume of volumes belonging to the second storage tier subsequently becomes a second volume satisfying the transfer requirement conditions.

The virtual allocation section then searches for a volume satisfying the transfer requirement conditions from volumes belonging to the third storage tier and searches for the third volume from the volumes satisfying the transfer requirement conditions based on non-essential conditions for transfer. It is preferable for the volume conditions for the third volume to coincide to as great an extent as possible with the volume conditions for the second volume. The virtual allocation section then, for example, searches for a third volume having non-essential conditions for transfer that most closely match the non-essential conditions for transfer of the second volume from the volumes satisfying the transfer requirement conditions When, for example, a volume of the volumes belonging to the second storage tier subsequently becomes a second volume satisfying the transfer requirement conditions, in the event that a plurality of third volumes exist, the relocation section relocates volumes of the plurality of third volumes, with the lowest rate of concordance of non-essential conditions for transfer between the second storage tier and the third storage tier to the second volume.

The transfer requirement conditions are, for example, that the capacity of the transfer destination volume is equal to or greater than the capacity of the transfer source volume. As well as not being the transfer requirement conditions, for example, either of identification information for the storage apparatus supplying the volume, type of storage apparatus supplying the volume, RAID level of the volume, or type of storage apparatus supplying the volume may be used as the non-essential transfer requirement conditions.

The storage system according to another aspect of the present invention is a storage system having storage resources comprised of a plurality of storage tiers, each containing one or more volumes. This system comprises a virtual allocation section for virtually allocating a third volume satisfying replication requirement conditions of volumes belonging to a third storage tier to a second storage tier in the event that a second volume satisfying the replication requirement conditions that is a replication destination of a first volume does not exist in the second storage tier when replicating the first volume belonging to a first storage tier to the second storage tier, and a replication section for replicating the first volume to the third volume.

According to this configuration, volume replication can be appropriately executed even when an empty volume does not exist in a storage tier designated as a replication destination of a volume.

Here, the replication section replicates the third volume to the second volume when a volume of volumes belonging to the second storage tier subsequently becomes a second volume satisfying the replication requirement conditions.

The virtual allocation section then searches for a volume satisfying the replication requirement conditions from volumes belonging to the third storage tier and searches for the third volume from the volumes satisfying the replication requirement conditions based on non-essential conditions for replication. It is preferable for the volume conditions for the third volume to coincide to as great an extent as possible with the volume conditions for the second volume. The virtual allocation section then, for example, searches for the third volume having non-essential conditions for replication that most closely match the non-essential conditions for replication of the second volume from the volumes satisfying the replication requirement conditions.

When a volume of the volumes belonging to the second storage tier subsequently becomes a second volume satisfying the replication requirement conditions, in the event that a plurality of third volumes exist, the replication section replicates volumes of the plurality of third volumes with the lowest rate of concordance of non-essential conditions for replication between the second storage tier and the third storage tier to the second volume.

The replication requirement conditions are, for example, that the capacity of the replication destination volume is equal to or greater than the capacity of the replication source volume. As well as not being the replication requirement conditions, for example, either of identification information for the storage apparatus supplying the volume, type of storage apparatus supplying the volume, RAID level of the volume, or type of storage apparatus supplying the volume may be used as the non-essential replication requirement conditions.

A storage system of another aspect of the present invention comprises a plurality of storage apparatus each respectively having one or more volumes, virtualizing apparatus for classifying into a plurality of storage tiers including one or more volumes and virtualizing into a single logical storage resource the plurality of storage apparatus, and a storage management server for instructing the storage apparatus to virtually allocate a second empty volume satisfying the capacity conditions within a volume belonging to the third storage tier to a second storage tier and relocate the first volume to the second empty volume in the event that a first empty volume satisfying a capacity condition taking the condition that the storage capacity of the volume of the transfer destination is the storage capacity of the transfer source or more does not exist in the second storage tier when the first volume belonging to the first storage tier is relocated to the second storage tier.

Here, when a volume of the volumes belonging to the second storage tier subsequently becomes the first empty volume satisfying the capacity conditions, the storage management server instructs the storage apparatus to relocate data relocated at the second empty volume to the first empty volume.

A storage system of another aspect of the present invention comprises a plurality of storage apparatus each respectively having one or more volumes, virtualizing apparatus for classifying into a plurality of storage tiers including one or more volumes and virtualizing into a single logical storage resource the plurality of storage apparatus, and a storage management server for instructing the storage apparatus to virtually allocate a second empty volume satisfying the capacity conditions within a volume belonging to the third storage tier to a second storage tier and replicate the first volume to the second empty volume in the event that a first empty volume satisfying a capacity condition taking the condition that the storage capacity of the volume of the replication destination is the storage capacity of the replication source or more does not exist in the second storage tier when the first volume belonging to the first storage tier is replicated to the second storage tier.

Here, when a volume of the volumes belonging to the second storage tier subsequently becomes the first empty volume satisfying the capacity conditions, the storage management server instructs the storage apparatus to replicate data replicated at the second empty volume to the first empty volume.

From another perspective of the present invention, a storage system having a plurality of volumes comprises a virtual allocation section for setting a third volume satisfying transfer requirement conditions as a virtual transfer destination for a first volume in the event that a second volume does not satisfy the transfer requirement conditions when the first volume is relocated to the second volume, and a relocation section for relocating the first volume to the third volume.

According to this configuration, volume relocation can be appropriately executed even when a volume designated as a transfer destination for the volume is not an empty volume.

From another perspective of the present invention, a storage system having a plurality of volumes comprises a virtual allocation section for setting a third volume satisfying replication requirement conditions as a virtual replication destination for a first volume in the event that a second volume does not satisfy the replication requirement conditions when the first volume is replicated to the second volume, and a replication section for replicating the first volume to the third volume.

According to this configuration, volume replication can be appropriately executed even when a volume designated as a replication destination for the volume is not an empty volume.

According to the present invention, volume relocation or replication can be appropriately executed even when an empty volume does not exist in a storage tier designated as a transfer destination or replication destination of a volume. Further, according to the present invention, volume relocation or replication can be appropriately executed even when a volume designated as a transfer destination or replication destination of a volume is not an empty volume.

BRIEF DESCRIPTION OF THE DRAWINGS

FIG. 17 is a view illustrating a table structure for an external volume table.

FIG. 18 is a view illustrating a table structure for a storage tier table.

FIG. 19 is a view illustrating a table structure for a storage table.

FIG. 20 is a view illustrating a table structure for a tier transfer information table.

FIG. 21 is a view illustrating a table structure for a volume table.

FIG. 22 is a view illustrating a table structure for an external volume table.

FIG. 23 is a view showing an example of a tier production screen 1301 for making storage tiers.

FIG. 24 is a view showing a selection screen for deleting virtual allocation of volumes.

FIG. 36 is a view illustrating a table structure for a virtual allocation table.

DETAILED DESCRIPTION

Embodiments

The following is a description with reference to each of the drawings of the embodiments of the present invention. Each embodiment by no means limits the scope of the patent claims and all of the features described in the embodiments are not limited to being mandatory as resolving means of the invention.

First Embodiment

Figure 1:
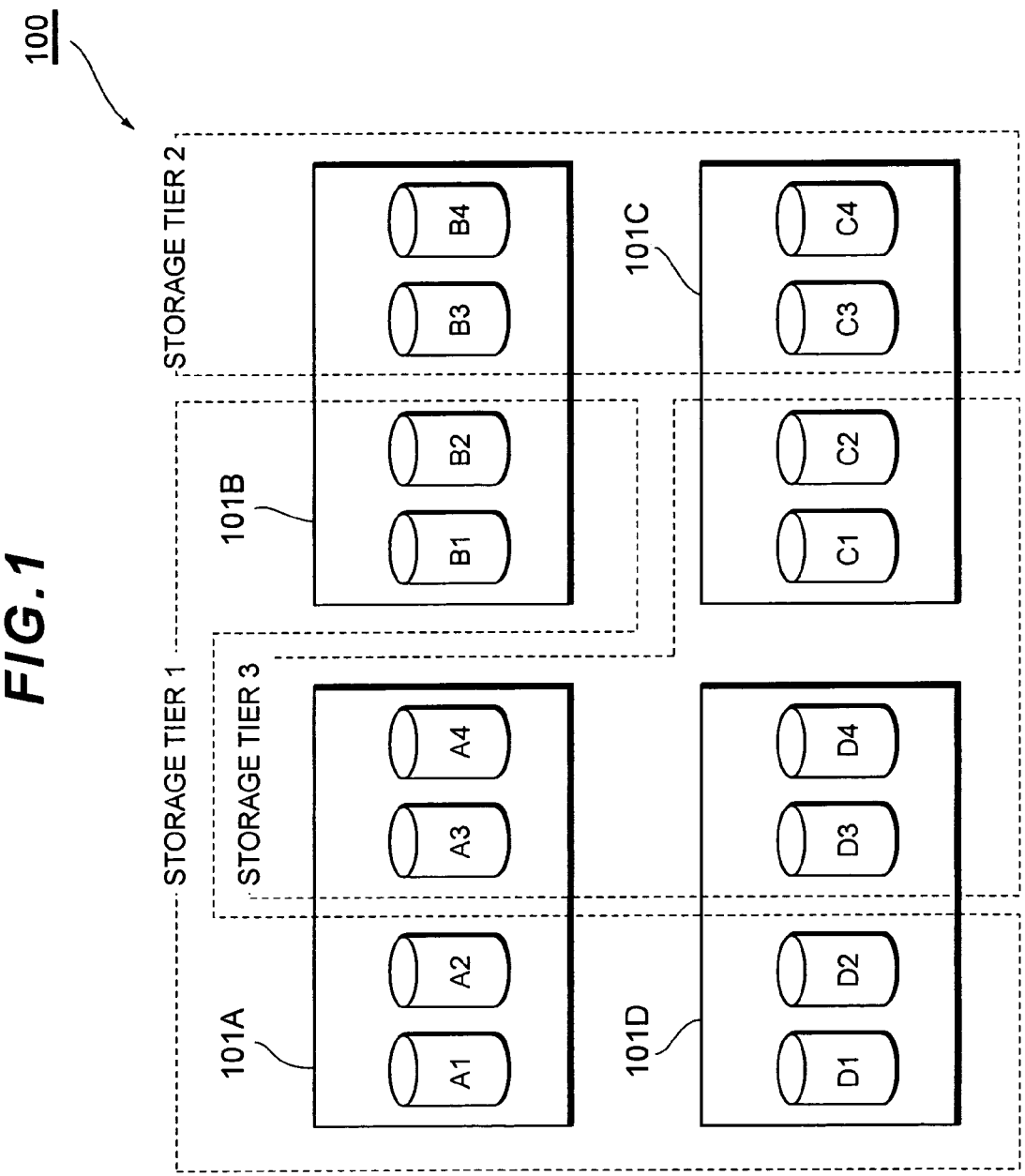
FIG. 1 is a view showing a configuration for storage tiers of a storage system.

First, the overall concept of the embodiments is outlined with reference to FIG. 1 to FIG. 5. FIG. 1 shows a storage tier of a storage system 100 of the embodiments. The storage system 100 is equipped with a plurality of storage apparatus 101A, 101B, 101C and 101D. Volumes possessed by each storage apparatus 101A, 101B, 101C and 101D are collectively managed as a single logical storage resource. As a result, a host computer (refer to FIG. 10) recognizes the plurality of storage apparatus 101A, 101B, 101C and 101D as a single storage system 100.

Each storage apparatus 101A, 101B, 101C and 101D has respective volumes A1 to A4, B1 to B4, C1 to C4, and D1 to D4. These volumes are logical storage regions (logical volumes) defined on physical storage regions of storage devices (for example, hard disc drives, semiconductor memory drives, optical disc drives, magnetic tape media, etc.)

Each storage apparatus 101A, 101B, 101C and 101D may respectively be mounted with the same type of storage drive or may be a mixture of different types of storage drives.

A user may then classify each volume possessed by the storage system 100 into a plurality of storage tiers 1, 2, 3. For example, a certain single storage tier 1 is defined as an upper order tier. An upper order tier may be defined as a volume group configured from high reliability discs such as FC (Fiber Channel) discs etc. using RAID1. According to this definition, an upper order tier may also be known as a high reliability layer or high-speed response tier. Further, another single storage tier 2 is defined as a middle order tier. The middle order tier may be defined as a volume group configured from cheap drives such as, for example, SATA (Serial AT Attachment) discs etc. using RAID5. According to this definition, a middle order tier by also be referred to as a low-cost tier. Still another single storage tier 3 is defined as a low order tier. The low order tier may be defined as a volume group defined on a cheap storage device such as, for example, a magnetic tape medium, etc. According to this definition, a low order tier may also be referred to as an archive tier.

The storage tier definition examples described above are merely given as examples, and definitions differing from the aforementioned definitions may also be adopted as storage tier definitions. For example, it is also possible to define storage tiers according to the specifications of the disc drives possessed by each of the respective storage apparatus 101A, 101B, 101C and 101D. For example, storage tiers may also be divided between high-speed FC disc drives and low-speed FC disc drives, or storage tiers may also be divided between large storage capacity FC disc drives and small storage capacity FC disc drives. It is also possible to divide into storage tiers according to the type of storage device (for example, hard disc drive, flexible disc drive, magnetic tape drive, semiconductor memory drive, or optical disc drive, etc.).

Further, "high order tier" and "low order tier" used in this specification are taken to merely indicate the relative relationship between storage tiers rather than referring to specific storage tiers. For example, in the relationship between storage tier 1 and storage tier 2, storage tier 1 is the "high order tier" and storage tier 2 is the "low order tier", while in the relationship between storage tier 2 and storage tier 3, storage tier 2 is the "high order tier" and storage tier 3 is the "low order tier".

The user can freely define the storage tier based on the policy (operating standard) of the storage system 100. The storage tier is logically defined and a plurality of volumes possessed by the same storage apparatus are not limited to belonging to the same storage tier. For example, taking note of a plurality of volumes A1 to A4 possessed by storage apparatus 101A, certain volumes A1 and A2 may belong to storage tier 1, while volumes A3, A4 may belong to storage tier 3. Further, depending on the conditions for defining storage tiers, the case of the same volume belonging to a plurality of storage tiers is conceivable, as is the presence of a volume that does not belong to any storage tier.

The value of the data also decreases with time. Data of a high value is placed in large capacity storage tier 1 of a superior response, and is frequently accessed from the host computer. As time passes, data for which the value has lowered is relocated from storage tier 1 to storage tier 2 from the point of view of data management costs, and before long is relocated from storage tier 2 to storage tier 3. Relocation of data may be controlled based on a policy defined in advance by the user, or relocation of data may be controlled based on data access frequency. Further, in the event that the value of the data becomes high or the access frequency becomes high, the data is relocated from the low order tier to the high order tier.

Next, a description is given with reference to FIG. 2 to FIG. 5 of the process at the time of relocation of data within a volume belonging to a certain storage tier to another storage tier.

Figure 2:
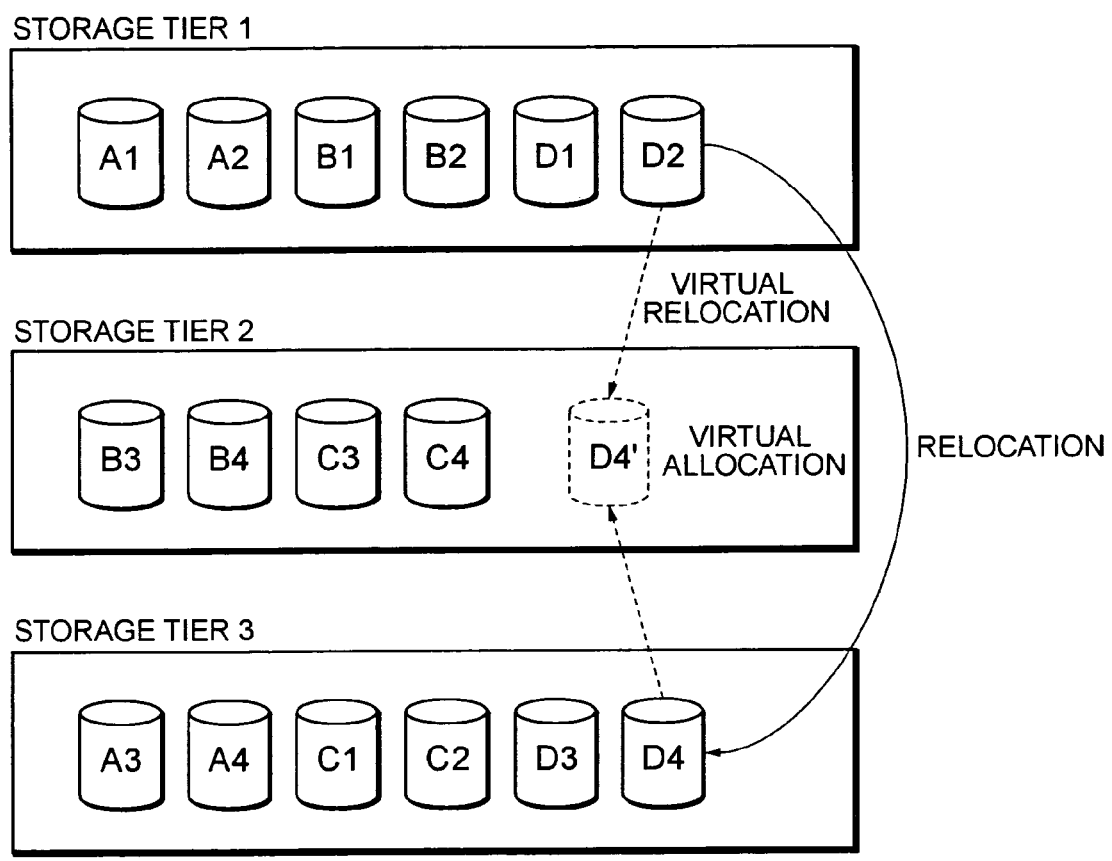
FIG. 2 is a view illustrating an outline of processing for relocating a volume.
Figure 3:
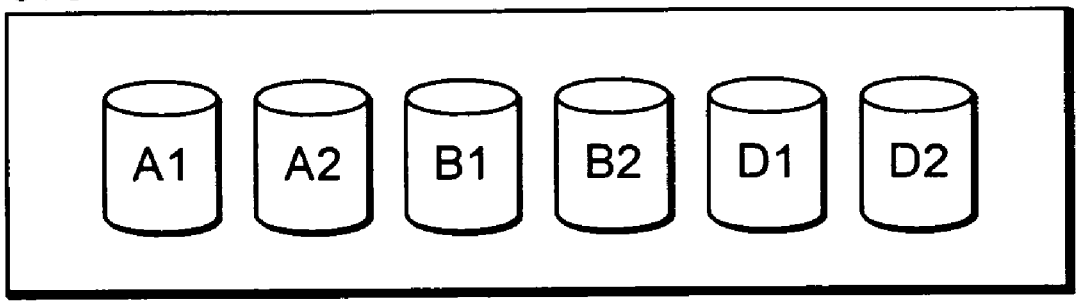
FIG. 3 is a further view illustrating an outline of processing for relocating a volume.
Figure 3:
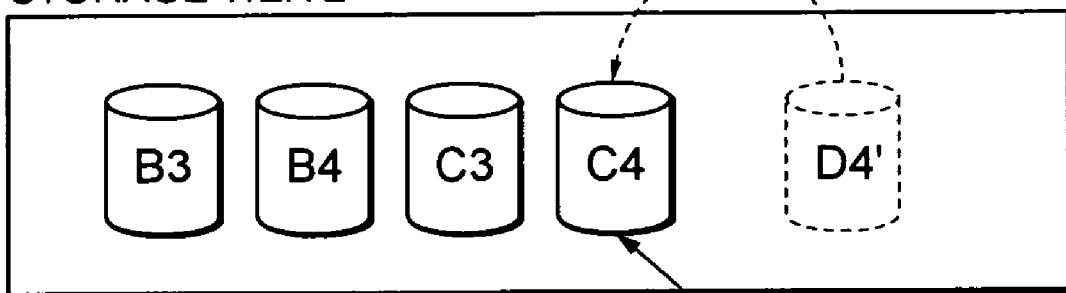
Figure 3:
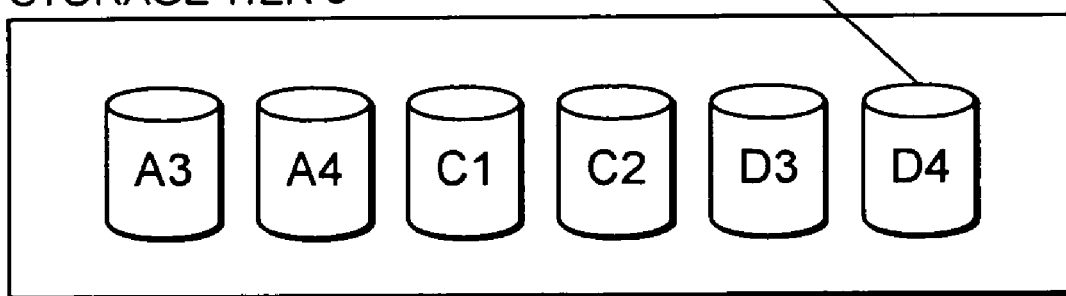

First, a description is given of the case of relocation of a volume belonging to a high order tier (for example, storage tier 1) to a low order tier (for example, storage tier 2) while referring to FIG. 2 and FIG. 3.

As shown in FIG. 2, when an instruction to relocate volume D2 to storage tier 2 is provided from a user, a storage management server checks whether or not an empty volume satisfying the conditions required for transfer exists in storage tier 2. The transfer requirement conditions can be said to be essential conditions required of a volume for a transfer destination, for example, "a transfer destination volume is a volume having storage capacity of greater than the capacity of the transfer source volume, and is a volume that has not yet been used". If an empty volume satisfying the transfer requirement conditions exists in the storage tier 2, the storage system 100 relocates the volume D2 into this empty volume.

If an empty volume satisfying the transfer requirement conditions does not exist in storage tier 2, the storage management server searches for an empty volume satisfying the transfer requirement conditions from another storage tier. Here, the case of volume D4 belonging to storage tier 3 satisfying the transfer requirement conditions is examined. The storage management server virtually allocates the volume D4 belonging to storage tier 3 to storage tier 2. "Virtually allocates" means that the storage tier is changed virtually in the management of the storage system 100. Looked at in another way, virtually allocating volume D4 to storage tier 2 is equivalent to newly adding a virtual volume D4' having the same attributes as the attributes of volume D4 (storage capacity, drive type, RAID level, drive configuration, emulation type etc.) to storage tier 2. Volume D4' then constitutes a virtual transfer destination for volume D2.

The storage system 100 then carries out processing to move data of the transfer source volume D2 to volume D4' set as the virtual transfer destination of volume D2. This transfer processing is, in reality, processing carrying out the relocation of data of volume D2 to volume D4.

After this, as shown in FIG. 3, consider the case where, for example, volume C4 within a plurality of volumes belonging to the original transfer destination tier (in this example, storage tier 2) of the transfer source volume D2 subsequently satisfies the transfer requirement conditions (i.e. the case where volume C4 is subsequently the original transfer destination volume). The user instructs relocation from volume D4' taken as an interim transfer destination to volume C4 taken as the original transfer destination. In doing so, storage system 100 carries out processing to re-arrange data of volume D4' in the volume C4. This relocation processing is, in reality, processing for rearranging data of volume D4 in volume C4.

Virtual allocation to the storage tier 2 of volume D4 is then terminated. Canceling of the virtual allocation is equivalent to logically deleting the volume D4' from storage tier 2.

Figure 4:
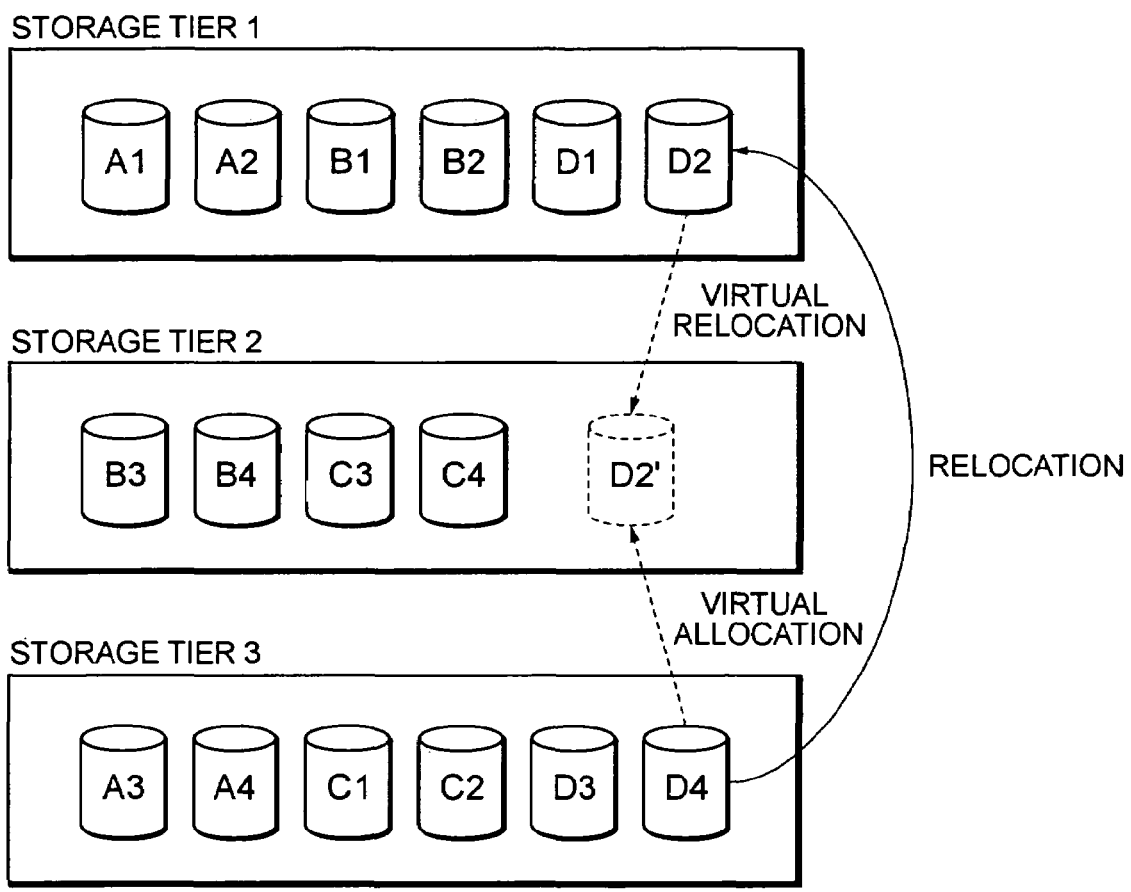
FIG. 4 is another further view illustrating an outline of processing for relocating a volume.
Figure 5:
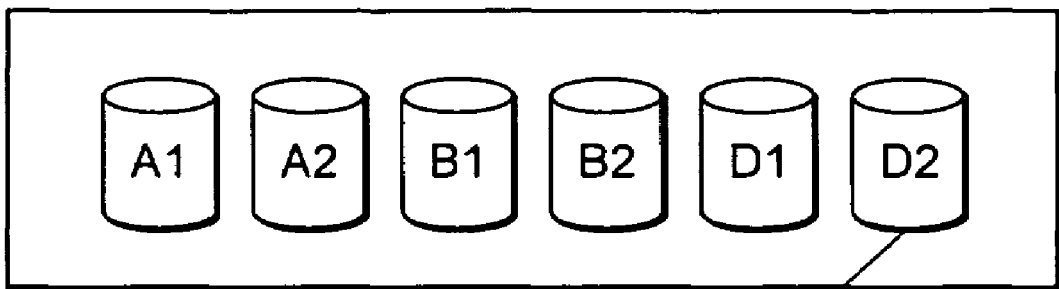
FIG. 5 is a still further view illustrating an outline of processing for relocating a volume.
Figure 5:
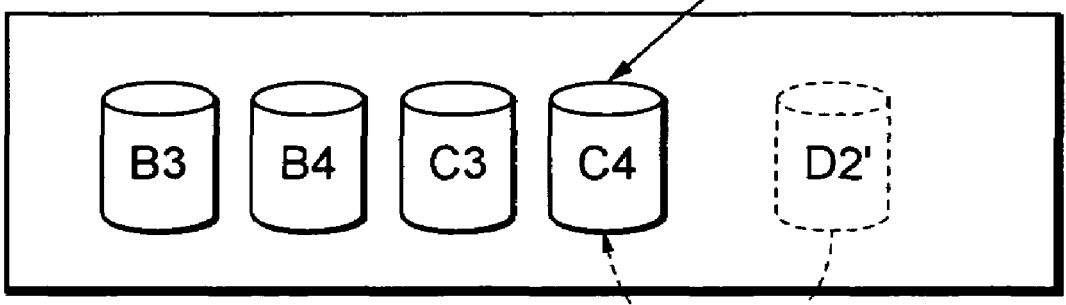
Figure 5:
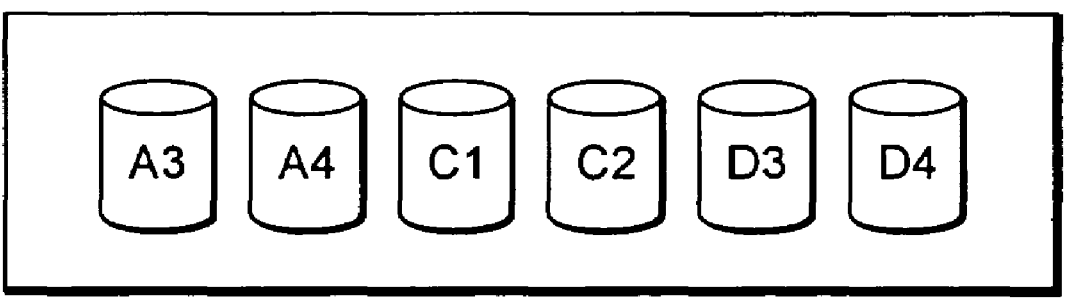

Next, a description is given of the case of relocation of a volume belonging to a low order tier (for example, storage tier 3) to a high order tier (for example, storage tier 2) while referring to FIG. 4 and FIG. 5.

As shown in FIG. 4, when an instruction to relocate volume D4 to storage tier 2 is provided from a user, the storage management server checks whether or not an empty volume satisfying the conditions required for transfer exists in storage tier 2. If an empty volume satisfying the transfer requirement conditions exists in the storage tier 2, the storage system 100 relocates the volume D4 into this empty volume.

If an empty volume satisfying the transfer requirement conditions does not exist in storage tier 2, the storage management server searches for an empty volume satisfying the transfer requirement conditions from another storage tier. Here, the case of volume D2 belonging to storage tier 1 satisfying the transfer requirement conditions is examined. The storage management server virtually allocates the volume D2 belonging to storage tier 1 to storage tier 2. Looked at in another way, virtually allocating volume D2 to storage tier 2 is equivalent to newly adding a virtual volume D2' having the same attributes as the attributes of volume D2 (storage capacity, drive type, RAID level, drive configuration, emulation type etc.) to storage tier 2. Volume D2' then constitutes a virtual transfer destination for volume D4.

The storage system 100 then carries out processing to move data of the transfer source volume D4 to volume D2' set as the virtual transfer destination of volume D4. This transfer processing is, in reality, processing carrying out the relocation of data of volume D4 to volume D2.

After this, as shown in FIG. 5, consider the case where, for example, volume C4 within a plurality of volumes belonging to the original transfer destination tier (in this example, storage tier 2) of the transfer source volume D4 subsequently satisfies the transfer requirement conditions (i.e. the case where volume C4 is subsequently the original transfer destination volume). The user instructs relocation from volume D2' taken as an interim transfer destination to volume C4 taken as the original transfer destination. In doing so, storage system 100 carries out processing to re-arrange data of volume D2' in the volume C4. This relocation processing is, in reality, processing for rearranging data of volume D2 in volume C4.

Virtual allocation to the storage tier 2 of volume D2 is then terminated. Canceling of the virtual allocation is equivalent to logically deleting the volume D2' from storage tier 2.

Next, a description is given with reference to FIG. 6 to FIG. 9 of an outline of processing when a replication (secondary volume) is made of a volume (primary volume) belonging to a certain storage tier at another storage tier.

Figure 6:
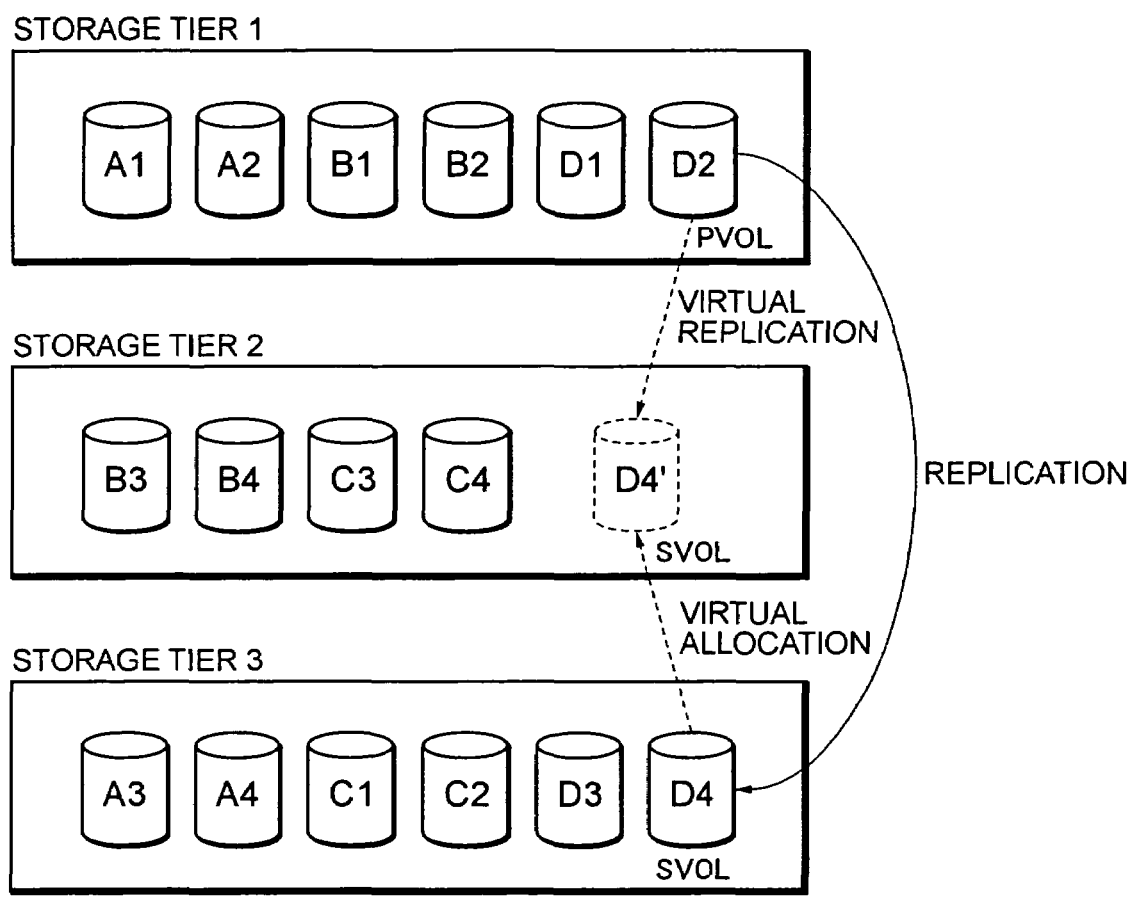
FIG. 6 is a view illustrating an outline of processing for replicating a volume.
Figure 7:
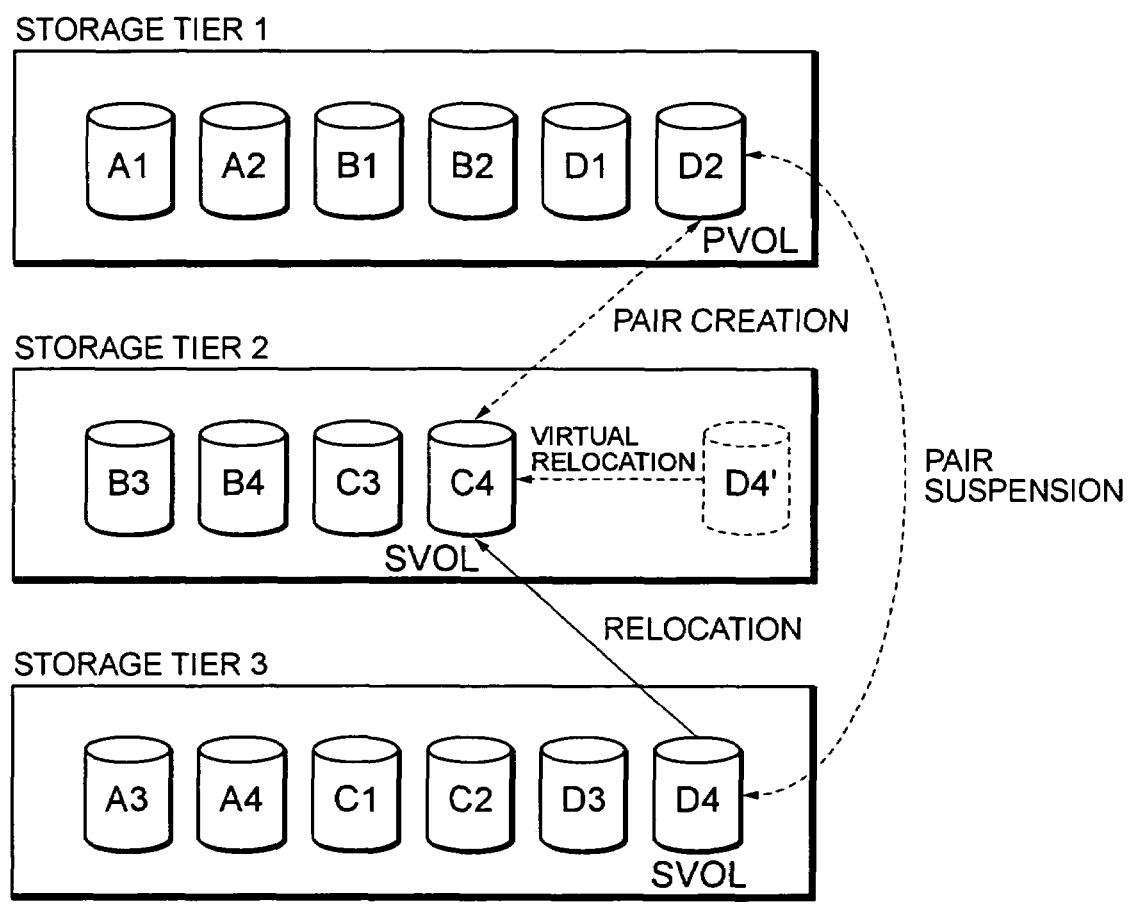
FIG. 7 is a view illustrating an outline of processing for replicating a volume.

First, a description is given of the case of making a replication of a volume belonging to a high order tier (for example, storage tier 1) at a low order tier (for example, storage tier 2) while referring to FIG. 6 and FIG. 7.

As shown in FIG. 6, when an instruction to make a replication of volume D2 to storage tier 2 is provided from a user, the storage management server checks whether or not an empty volume satisfying the conditions required for replication exists in storage tier 2. The replication requirement conditions can be said to be essential conditions required of the secondary volume, for example, "a secondary volume is a volume having storage capacity of greater than the capacity of the primary volume, and is a volume that has not yet been used". If an empty volume satisfying the replication requirement conditions exists in the storage tier 2, the storage system 100 makes a replication of the volume D2 into this empty volume.

If an empty volume satisfying the replication requirement conditions does not exist in storage tier 2, the storage management server searches for an empty volume satisfying the replication requirement conditions from another storage tier. Here, the case of volume. D4 belonging to storage tier 3 satisfying the replication requirement conditions is examined. The storage management server virtually allocates the volume D4 belonging to storage tier 3 to storage tier 2. Looked at in another way, virtually allocating volume D4 to storage tier 2 is equivalent to newly adding a virtual volume D4' having the same attributes as the attributes of volume D4 (storage capacity, drive type, RAID level, drive configuration, emulation type etc.) to storage tier 2. Volume D4' constitutes a virtual replication destination (target) of the replication source volume D2 (source).

The storage system 100 then carries out processing to replicate data of the replication source volume D2 to volume D4' set as the virtual replication destination of volume D2. This replication processing is, in reality, processing carrying out the replication of data of volume D2 to volume D4. A pair state between the volume D2 and the volume D4' in management of the storage system 100 is a synchronous state. In reality, the pair state between volume D2 and volume D4 is synchronous.

After this, as shown in FIG. 7, consider the case where, for example, volume C4 within a plurality of volumes belonging to the original replication destination tier (in this example, storage tier 2) of the replication source volume D2 subsequently satisfies the replication requirement conditions (i.e. the case where volume C4 is subsequently the original replication destination volume). The user instructs relocation from volume D4' taken as an interim replication destination to volume C4 taken as the original replication destination. In doing so, the storage system 100 splits the pair state between the volume D2 and the volume D4', and carries out processing to relocate data of volume D4' to volume C4. In this relocation processing, in reality, the pair state between volume D2 and volume D4 is split, and processing is carried out to relocate data of volume D4 to volume C4.

The pair state between the replication source volume D2 and the original destination volume C4 then becomes a synchronous state. On the other hand, virtual allocation to the storage tier 2 of volume D4 is terminated. Canceling of the virtual allocation is equivalent to logically deleting the volume D4' from storage tier 2.

Figure 8:
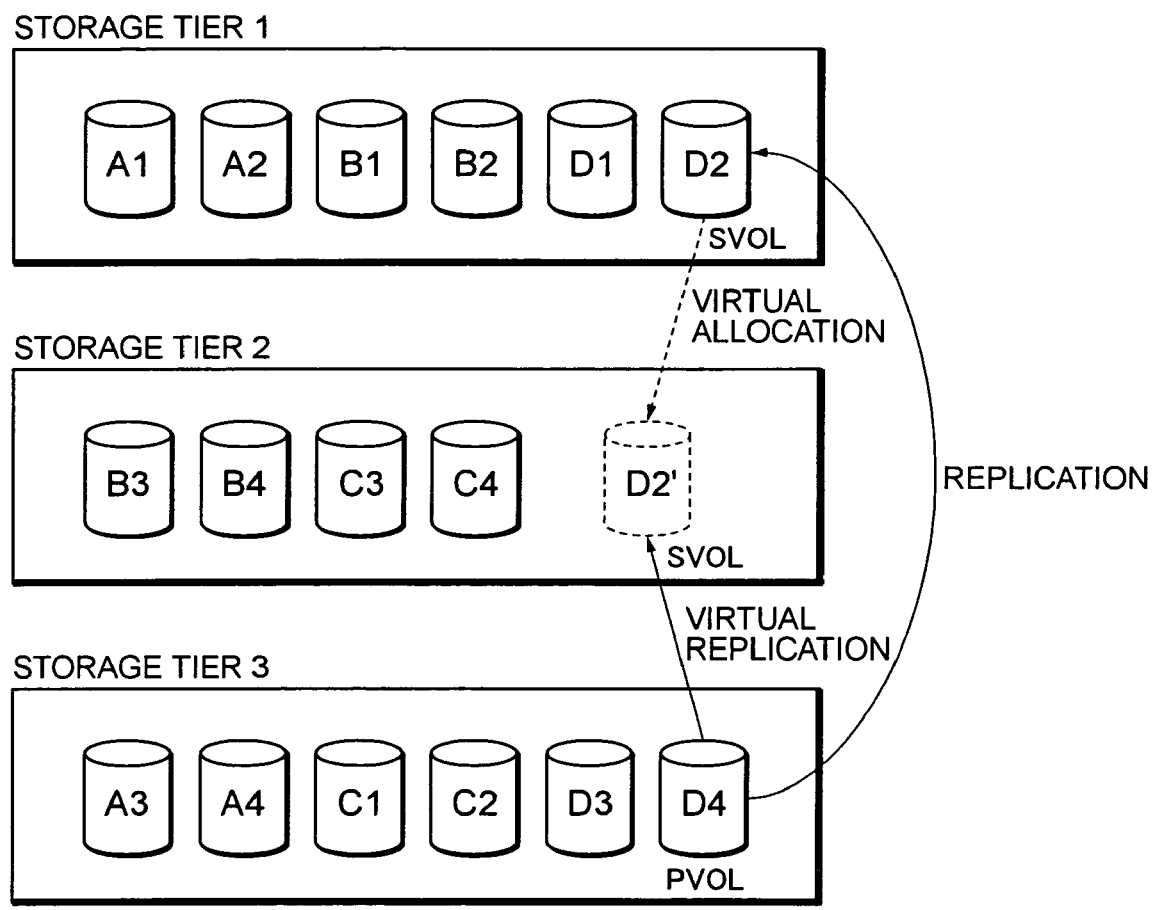
FIG. 8 is another view illustrating an outline of processing for replicating a volume.
Figure 9:
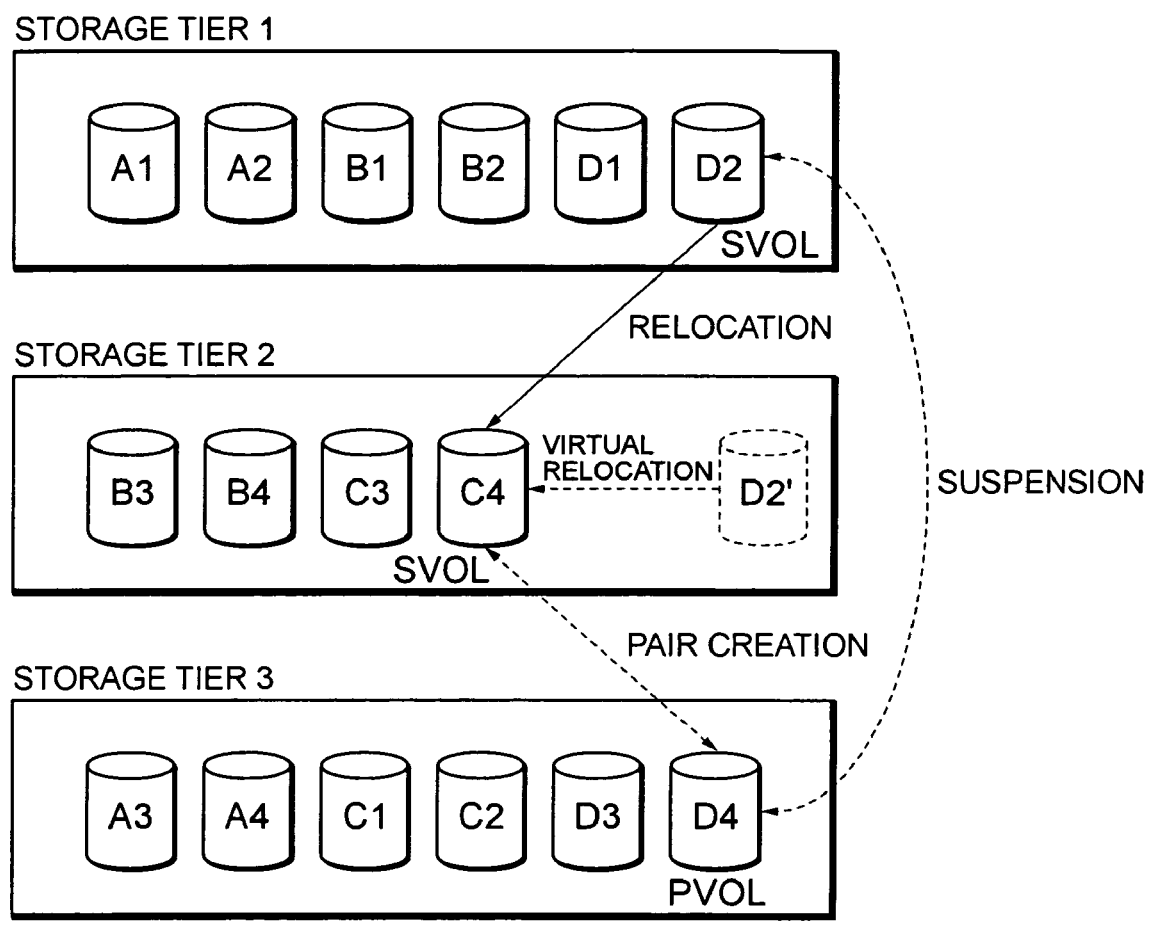
FIG. 9 is a further view illustrating an outline of processing for replicating a volume.

First, a description is given of the case of making a replication of a volume belonging to a low order tier (for example, storage tier 3) at a high order tier (for example, storage tier 2) while referring to FIG. 8 and FIG. 9.

As shown in FIG. 8, when an instruction to make a replication of volume D4 to storage tier 2 is provided from a user, the storage management server checks whether or not an empty volume satisfying the conditions required for replication exists in storage tier 2. If an empty volume satisfying the replication requirement conditions exists in the storage tier 2, the storage system 100 makes a replication of the volume D4 into this empty volume.

If an empty volume satisfying the replication requirement conditions does not exist in storage tier 2, the storage management server searches for an empty volume satisfying the replication requirement conditions from another storage tier. Here, the case of volume D2 belonging to storage tier 1 satisfying the replication requirement conditions is examined. The storage management server virtually allocates the volume D2 belonging to storage tier 1 to storage tier 2. Looked at in another way, virtually allocating volume D2 to storage tier 2 is equivalent to newly adding a virtual volume D2' having the same attributes as the attributes of volume D2 (storage capacity, drive type, RAID level, drive configuration, emulation type etc.) to storage tier 2. Volume D2' constitutes a virtual replication destination (target) of the replication source volume D4 (source).

The storage system 100 then carries out processing to replicate data of the replication source volume D4 to volume D2' set as the virtual replication destination of volume D4. This replication processing is, in reality, processing carrying out the replication of data of volume D4 to volume D2. A pair state between the volume D4 and the volume D2' in management of the storage system 100 is a synchronous state. In reality, the pair state between volume D4 and volume D2 is synchronous.

After this, as shown in FIG. 9, consider the case where, for example, volume C4 within a plurality of volumes belonging to the original replication destination tier (in this example, storage tier 2) of the replication source volume D4 subsequently satisfies the replication requirement conditions (i.e. the case where volume C4 is subsequently the original replication destination volume). The user instructs relocation from volume D2' taken as an interim replication destination to volume C4 taken as the original replication destination. In doing so, the storage system 100 splits the pair state between the volume D4 and the volume D2', and carries out processing to relocate data of volume D2' to volume C4. In this relocation processing, in reality, the pair state between volume D4 and volume D2 is split, and processing is carried out to relocate data of volume D2 to volume C4.

The pair state between the replication source volume D4 and the original replication destination volume C4 then becomes a synchronous state. On the other hand, virtual allocation to the storage tier 2 of volume D2 is terminated. Canceling of the virtual allocation is equivalent to logically deleting the volume D2' from storage tier 2.

Next, an additional description is given with reference to FIG. 10 to FIG. 30 of a specific configuration for the storage system 100 of this embodiment, and of the details of the volume relocation processing and replication making processing.

Figure 10:
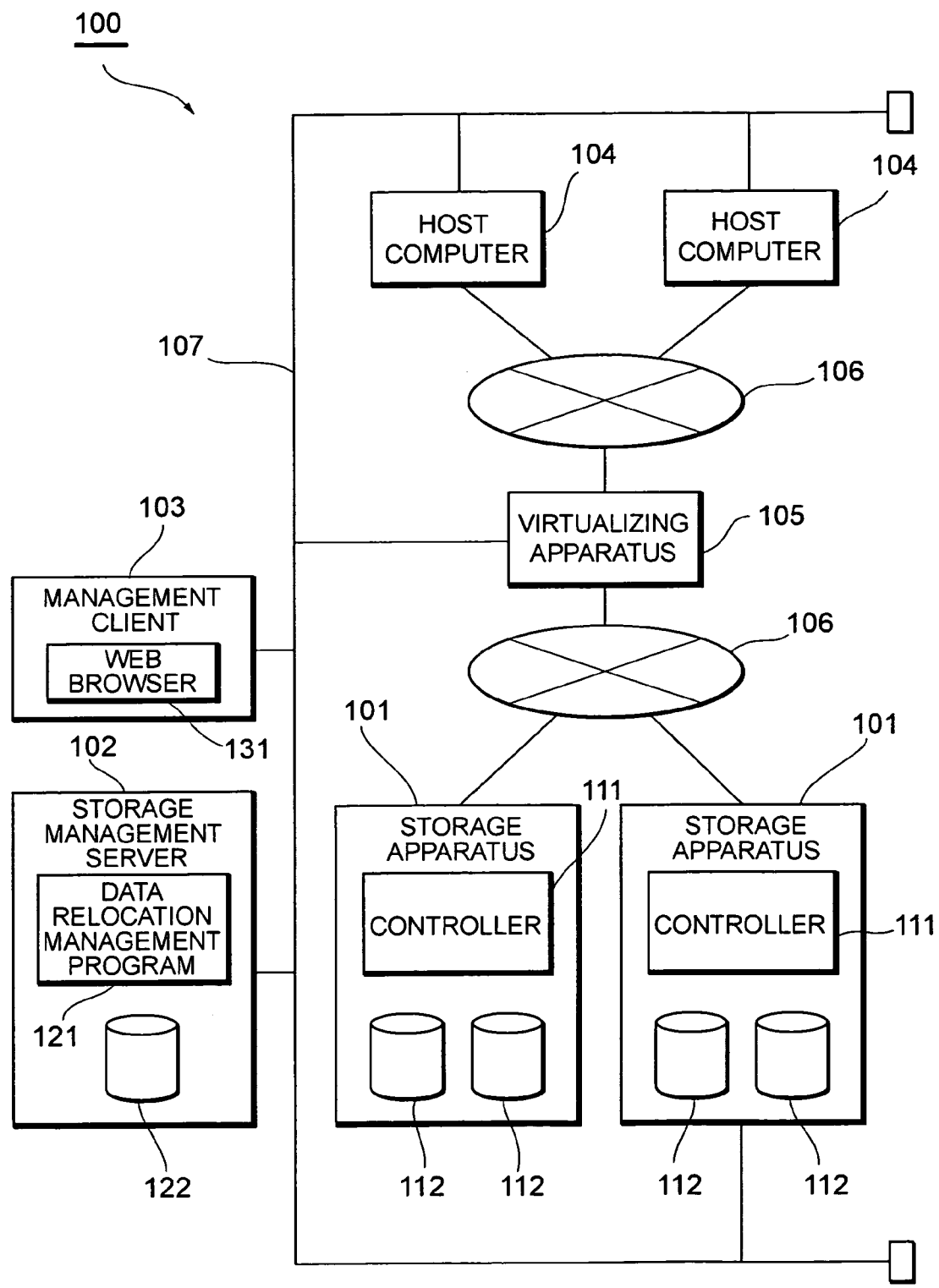
FIG. 10 is a view of a hardware configuration for a storage system.

FIG. 10 shows a hardware configuration of storage system 100. The storage system 100 is comprised of a plurality of storage apparatus 101, a storage management server 102, a management client 103, one or more host computers 104, virtualizing apparatus 105, a storage network 106, and a management network 107.

A host computer 104 may be a work station system, mainframe computer, or personal computer, etc. The host computer 104 executes various operation processing (for example, database processing, web application processing, streaming processing, etc.) utilizing storage resources supplied by each storage apparatus 101.

The storage network 106 connects the one or more host computers 104 and the plurality of storage apparatus 101. The storage network 106 is, for example, a SAN (Storage Area Network), LAN (Local Area Network), WAN (Wide Area Network), the Internet, a dedicated line, or a public line, etc. The host computer 104 recognizes storage resources respectively in the possession of a plurality of storage apparatus 101 as a single storage resource by connecting the plurality of storage apparatus 101 via the virtualizing apparatus 105. The virtualizing apparatus 105 may be, for example, a virtualization switch, an intelligent switch, or a virtualization-dedicated apparatus, etc. The virtualizing apparatus 105 is not essential in the event that one of the host computer 104 or the storage system 101 has a virtualizing function.

The storage apparatus 101 has a controller 111 and a plurality of storage devices 112.

The controller 111 is capable of controlling the plurality of storage devices 112 using RAID levels (for example, 0, 1, 5) defined in a RAID system. The RAID system manages the plurality of storage devices 112 as a single RAID group. A RAID group is configured from, for example, four storage devices 112 grouped together into one set (3D+1P), or eight disc drives 240 grouped together into one set (7D+1P). Namely, the storage regions respectively provided by the plurality of storage devices 112 are gathered together to make up a single RAID group. One or more volumes constituting access units from the host computer 104 are defined on a RAID group.

The storage devices 112 are, for example, physical devices such as an F C (Fiber Channel) disc drive, a S A T A (Serial Advanced Technology Attachment) disc drive, a P A T A (Parallel Advanced Technology Attachment) disc drive, a F A T A (Fiber Attached Technology Adapted) disc drive, an S A S (Serial Attached SCSI) disc drive, or an S C S I (Small Computer System Interface) disc drive, etc. A physical device is a real device having a real storage region.

Each storage apparatus 101 may be the same type of storage apparatus or may types where the performance and price are different.

The management network 107 connects the one or more host computers 104, plurality of storage apparatus 101, management client 103, and storage management server 102, and is used in the transmission and receipt of management information, etc.

The management client 103 is a computer for maintaining and managing the storage system 100. The user maintains and manages the storage system 100 by inputting storage management commands via a web browser 131 installed on the management client 103. A storage management command is, for example, a command instructing increasing or decreasing, or changing the raid configuration of, the storage device 112, and is for setting a communication path between the host computer 104 and the storage apparatus 101.

The storage management server 102 receives various storage management commands from management client 103 and maintains and manages the storage system 100. The storage management server 102 has a data relocation management program 121. The data relocation management program 121 executes a process for rearranging volumes between the storage tier (FIG. 2 to FIG. 5), and a process for making a replication of a volume between storage tiers (FIG. 6 to FIG. 9). The storage management server 102 has a storage apparatus 122 for housing configuration information etc. for the storage system 100.

Figure 11:
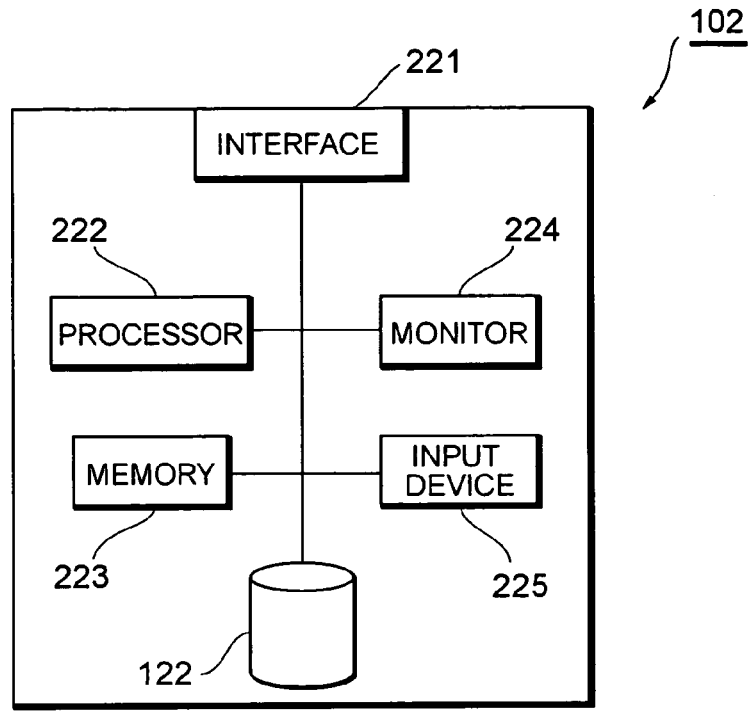
FIG. 11 is a view of a hardware configuration for the storage management server.

FIG. 11 shows a hardware configuration for the storage management server 102. Storage management server 102 is equipped with an interface 221, processor 222, memory 223, monitor 224, input device 225 and storage apparatus 122.

The interface 221 is a LAN adapter etc. for connecting to the management network 107. The interface 221 acquires configuration information from storage apparatus 101 and virtualizing apparatus 105, and sends volume relocation instructions and replication instructions etc. to the storage apparatus 101.

The processor 222, in addition to carrying out maintenance and management of the storage system 100 based on the program stored in memory 223, executes processing to relocate volumes between storage tiers based on data relocation management program 121, and processing to make replications of volumes between storage tiers.

The monitor 224 is a display for providing a storage management screen to a user as a GUI (Graphical User Interface). The input device 225 is for inputting storage management commands and is, for example, a keyboard and mouse, etc. The monitor 224 and the input device 225 are by no means essential.

Figure 12:
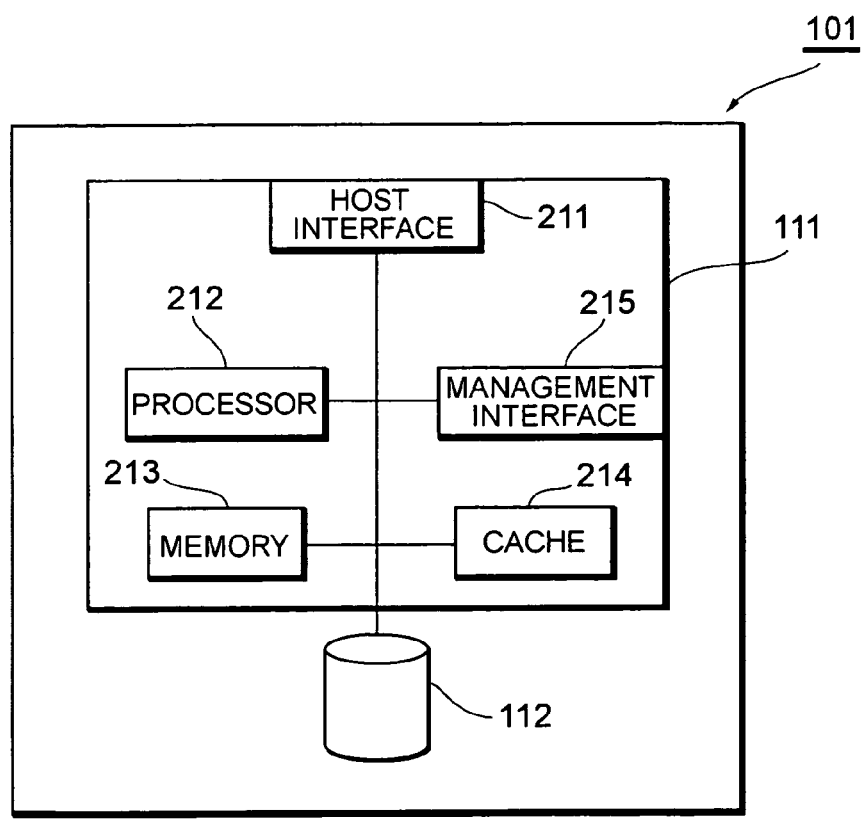
FIG. 12 is a view of a hardware configuration for storage apparatus.

FIG. 12 shows a hardware configuration of the storage apparatus 101. The controller 111 contains a host interface 211, a processor 212, memory 213, cache memory 214, and a management interface 215.

The host interface 211 is a network interface for connecting to host computer 104 via the storage network 106.

The processor 212 controls input and output of data to and from the storage device 112 in response to a data input/output request from the host computer 104.

Figure 15:
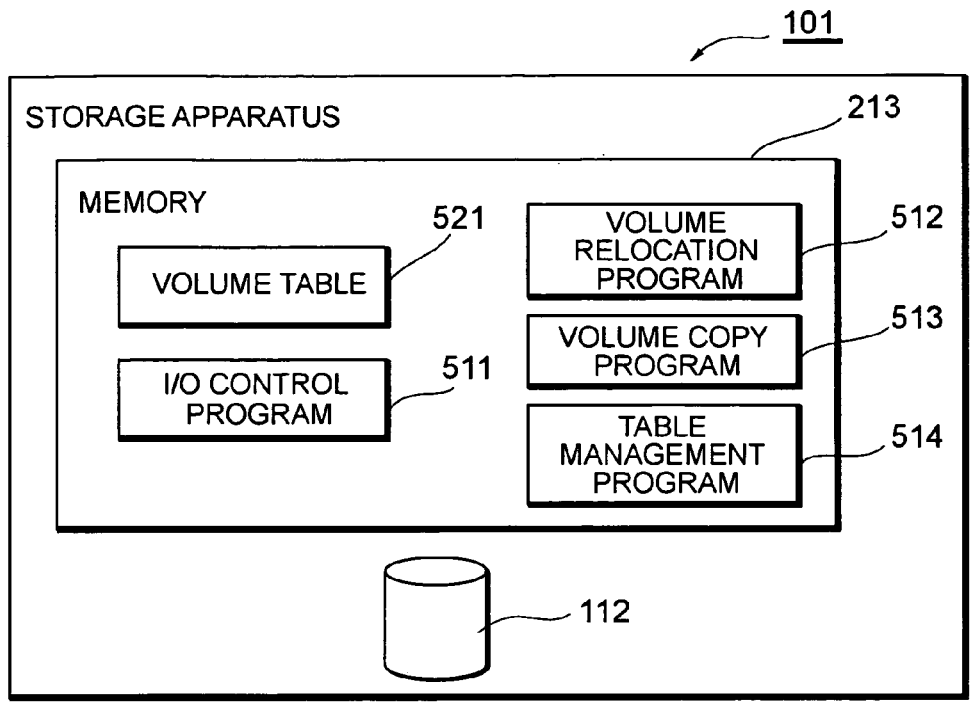
FIG. 15 is a view of a configuration for functions of storage apparatus.

The memory 213 stores microprograms etc. for use in various controls. The details of the microprograms etc. are described in the following (FIG. 15).

The cache memory 214 temporarily stores data inputted and outputted to and from the storage device 112.

The management interface 215 is a network interface for connecting to the storage management server 102 and the management client 103 via the management network 107.

Figure 13:
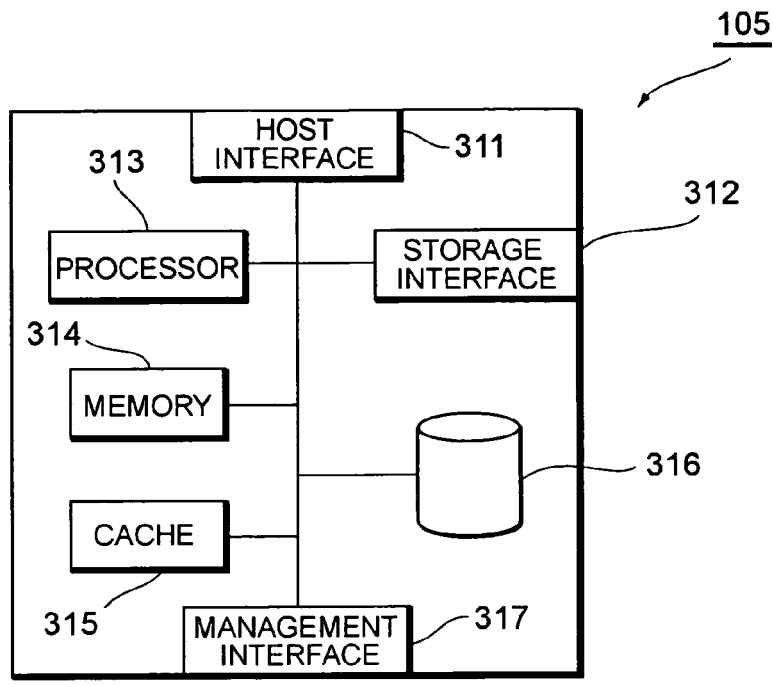
FIG. 13 is a view of a hardware configuration for virtualizing apparatus.

FIG. 13 shows a hardware configuration of the virtualizing apparatus 105. The virtualizing apparatus 105 contains a host interface 311, a storage interface 312, a processor 313, memory 314, cache memory 315, storage apparatus 316 and management interface 317.

The host interface 311 is a network interface for connecting to host computer 104 via the storage network 106.

The storage interface 312 is a network interface for connecting to the storage apparatus 101 via the storage network 106.

The processor 313 carries out processing for virtualizing storage resources supplied by the plurality of storage apparatus 101 logically as a single storage resource.

Figure 16:
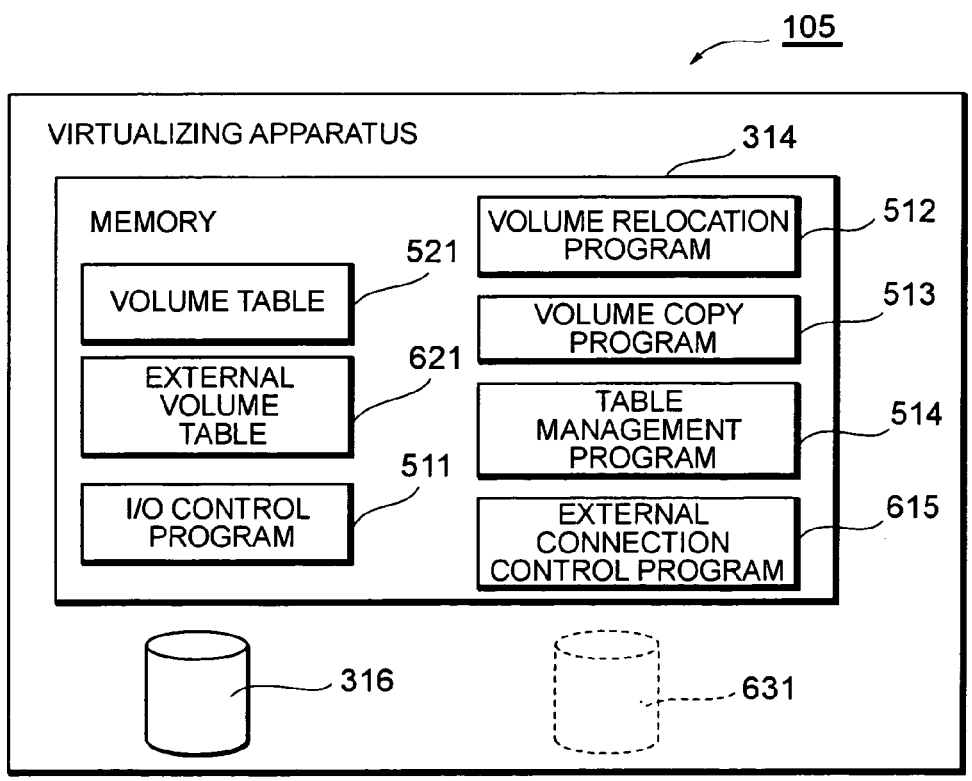
FIG. 16 is a view of a configuration for functions of virtualizing apparatus.

The memory 314 stores microprograms etc. for use in various controls. The details of the microprograms etc. are described in the following (FIG. 16).

The cache memory 315 temporarily stores data inputted and outputted to and from the storage apparatus 316.

The management interface 317 is a network interface for connecting to the storage management server 102 and the management client 103 via the management network 107.

Figure 14:
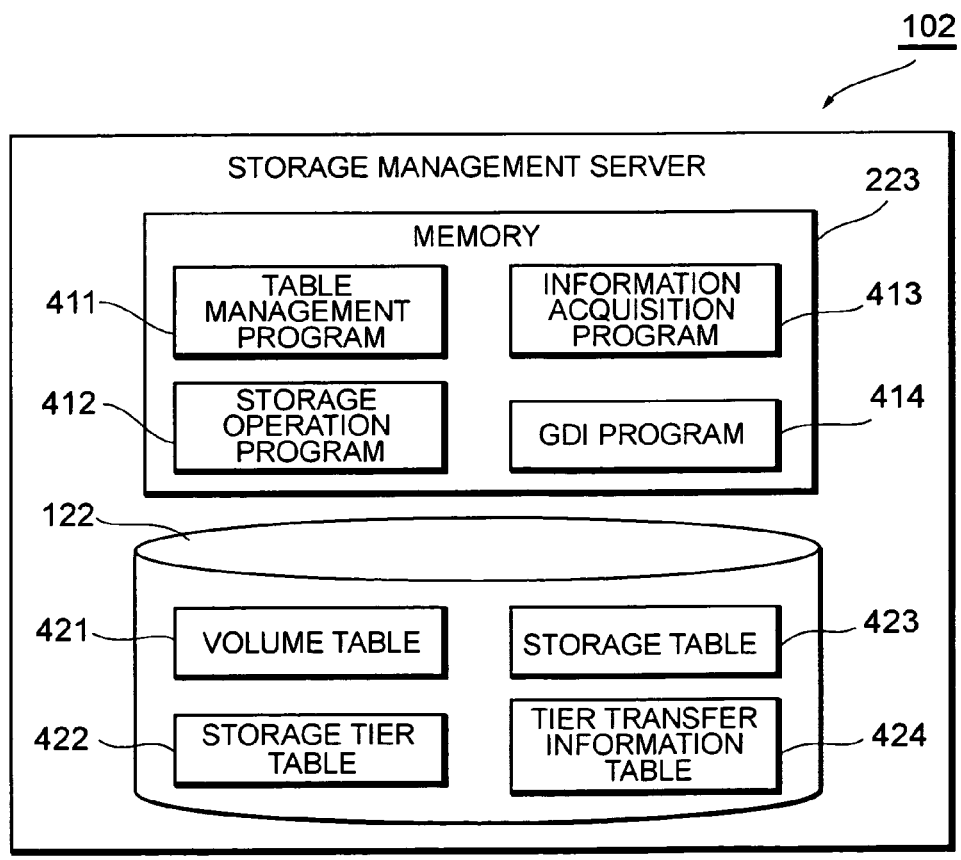
FIG. 14 is a view of a configuration for functions of a storage management server.

FIG. 14 shows a functional configuration for the storage management server 102. A table management program 411, storage operation program 412, information acquisition program 413, and GUI program 414 are stored in the memory 223. A repository (volume table 421, storage tier table 422, storage table 423 and tier transfer information table 424) are stored in the storage apparatus 122. The details of the volume table 421, storage tier table 422, storage table 423 and tier transfer information table 424 are described in the following (FIG. 17 to FIG. 20).

The table management program 411 is a program for carrying out input and output of repositories. The storage operation program 412 is a program for issuing commands to the storage apparatus 101. The information acquisition program 413 is a program for acquiring configuration information from the storage apparatus 101. The GUI program 414 is a program for providing a user interface (for example, FIG. 23, FIG. 24) for managing the storage apparatus 101.

FIG. 15 shows a function configuration of the storage apparatus 101. A volume table 521, I/O control program 511, volume relocation program 512, volume copy program 513, and table management program 514 are stored in memory 213.

The volume table 521 holds information indicating the corresponding relationship between the volume and the storage device 112 and information relating to volume characteristics. The details of the volume table 521 are described in the following (FIG. 21).

The I/O control program 511 is a program controlling input and output of data to and from the storage device 112 in response to I/O requests from the host computer 104.

The volume relocation program 512 is a program for changing the corresponding relationship of volumes and the storage device 112. The host computer 104 identifies the volumes using the ID's so as to recognize the positions (logical addresses) of logical storage regions on volumes capable of reading and writing data but does not recognize the positions (physical addresses) of physical storage regions on the storage devices 112. Volume relocation is a function for changing the position of physical storage regions on volumes identified by the host computer 104. The volume relocation program 512 is capable of relocating a volume belonging to a certain storage tier to another storage tier.

The volume copy program 513 is a program for making a replication of a certain volume at another volume. The copy source volume is referred to as the primary volume (PVOL), and the copy destination volume is referred to as the secondary volume (SVOL). In the event that the pair state between the primary volume and the secondary volume is a synchronous state, when data updating occurs at the primary volume, this data updating is reflected in the secondary volume. The storage device 112 supplying the storage region of the secondary volume may be the same as the storage device 112 supplying the storage region for the primary volume or may be different. The storage apparatus 101 supplying the storage region of the secondary volume may be different to the storage device 101 supplying the storage region for the primary volume or may be different.

The table management program 514 is a program for reading and writing information held in the volume table 521.

FIG. 16 shows a function configuration of the virtualizing apparatus 105. The volume table 521, an external volume table 621, the I/O control program 511, volume relocation program 512, volume copy program 513, table management program 514, and an external connection control program 615 are stored in memory 314.

The virtualizing apparatus 105 has one or more virtual volumes 631. The virtual volumes 631 are volumes where the volumes supplied by the storage apparatus 101 are virtually allocated. For ease of description, volumes supplied by the storage apparatus 101 are referred to as external volumes. Addressing areas of the virtual volumes 631 are mapped to addressing areas of the external volumes. The host computer 104 recognizes the virtual volumes 631 as storage resources for storage apparatus 101 and issues I/O requests to virtual volume 631. When an I/O request is received from the host computer 104, the virtualizing apparatus 105 carries out address conversion between the virtual volume 631 and the external volume, transfers a command (I/O request from the host computer 104) to the storage apparatus 101, and accesses an external volume. Respective external volumes in the possession of the plurality of storage apparatus 101 can then be allocated to the virtual volume 631. As a result, the virtualizing apparatus 105 is capable of virtualizing storage resources in the possession of a plurality of storage apparatus 101 into a single storage resource.

The external connection control program 615 is a program for controlling external connections (for example address conversion between the virtual volume 531 and external volumes, and command transfer to the storage apparatus 101, etc.) between the virtualizing apparatus 105 and the storage apparatus 101.

The external volume table 621 holds information indicating a correlating relationship between the virtual volume 631 and external volumes. The details of the external volume table 621 are described in the following (FIG. 22).

FIG. 17 shows a table configuration for the volume table 421. The volume table 421 holds information relating to volumes supplied by the storage apparatus 101. The volume table 421 correlates ID 801, storage ID 802, VOL #803, RAID level 804, disc type 805, capacity 806, usage state 807, and assigned tier 808 for respective volumes.

ID 801 is an ID for identifying a volume.

Storage ID 802 is an ID for identifying the storage apparatus 101.

VOL #803 is a number for identifying a volume within storage apparatus 101.

RAID level 804 indicates a volume RAID level.

Disc type 805 indicates the disc type (for example, information for classifying the FC disc and SATA disc) of the storage device 112 supplying the volume storage region.

The capacity 806 indicates the storage capacity of the volume.

The usage state 807 indicates the volume usage state. For example, "IN USE", "PVOL", "SVOL", and "EMPTY" exist as volume usage states. "IN USE" indicates that the volume is being accessed by the host computer 104 and that a replication is not made. "PVOL" indicates that the volume is a primary volume. "SVOL" indicates that the volume is a secondary volume. "EMPTY" indicates that the volume is in an as-yet unused state.

The assigned tier 808 indicates the assigned tier (the assigned tier logically recognized by the host computer 104) of a volume. The assigned tier 808 is not limited to being shown as the storage tier the volume actually belongs to. For example, when a volume is virtually allocated to another storage tier from the storage tier it originally belongs to, the assigned tier 808 indicates that the storage tier of the virtually assigned destination.

FIG. 18 shows a table configuration for storage tier table 422. The storage tier table 422 is in possession of information relating to storage tiers. The storage tier table 422 correlates an ID 901, a tier name 902, and tier conditions 903 for respective storage tiers.

ID 901 is an ID for identifying a storage tier.

The tier name 902 indicates the name of a storage tier.

The tier conditions 903 are conditions assigning definitions to the storage tiers. For example, "capacity", "apparatus ID", "apparatus type", "RAID level" and "disc type" can be included in the tier conditions 903 and it is possible to a combination of one or more from these. Here, "capacity" indicates the storage capacity of a storage tier. "apparatus ID" is an ID for identifying storage apparatus 101. "apparatus type" indicates a type (for example, information for distinguishing between new apparatus and old apparatus) of storage apparatus 101. Here, "RAID level" indicates the "RAID level" of a storage tier. "disc type" indicates the disc type of a storage device 112 providing a storage region for a storage tier.

FIG. 19 shows a table configuration for storage table 423. The storage table 423 holds information relating to the storage apparatus 101. The storage table 423 correlates ID 701, storage name 702, and apparatus type 703 with the respective storage apparatus 101.

ID 701 is an ID for identifying storage apparatus 101.

The storage name 702 indicates the name of the storage apparatus 101.

"apparatus type" indicates a type (for example, information for distinguishing between new apparatus and old apparatus) of storage apparatus 101.

FIG. 20 shows a table configuration for the tier transfer information table 424. Tier transfer information table 424 holds information relating to virtual allocation of the volume. Tier transfer information table 424 correlates ID1001, VOL-ID1002, virtual allocation source tier 1003, virtual allocation destination tier 1004, transfer time of day 1005, and operation 1006 with respective tier transfer information.

ID1001 is an ID for identifying tier transfer information.

VOL-ID1002 indicates an ID (ID 801 held in volume table 421) for identifying a volume.

Virtual allocation source tier 1003 indicates an ID (ID 901 held in storage tier table 422) for identifying a storage tier a virtually allocated volume originally belonged to.

The virtual allocation destination tier 1004 indicates an ID (ID 901 held in storage tier table 422) for identifying storage tiers of a virtually allocated destination for a volume.

The transfer time of day 1005 indicates the time of day a volume relocation operation or replication operation is carried out.

Operation 1006 indicates information ("relocation" or "replication") relating to a volume operation.

For example, tier transfer information having ID"001" indicates "a volume having "VOL-ID"010" originally belonged to storage tier "003" but belongs virtually to storage tier "002"". As a result, the volume having VOL-ID "010" can be seen to appear to belong to storage tier "0002" as viewed from the host computer 104.

FIG. 21 shows a table configuration for the volume table 521. Volume table 521 holds information required for the controller 111 to read and write data to the volumes. The volume table 521 correlates VOL-ID1101, VDEV-ID1102, Port-ID1103, RAID level 1104, disc type 1105, capacity 1106 and usage state 1107 for respective volumes. VOL-ID1101 indicates an ID for identifying volumes within the storage apparatus 101.

Here, VDEV-ID1102 indicates an ID for identifying virtual devices storage regions on volumes are allocated to.

Port-ID1103 indicates an ID for identifying ports allocated to volumes.

RAID level 1104 indicates a RAID level of a storage region on a volume. The drive configuration of the storage device 112 may be included in the RAID level 1104.

Disc type 1105 indicates the disc type of a storage device 112 providing a storage region on a volume.

The capacity 1106 indicates the storage capacity of the volume.

The usage state 1107 indicates the volume usage state. For example, "IN USE", "SVOL", and "EMPTY" are present in usage state 1107. "IN USE" indicates that the volume is being accessed by the host computer 104. "SVOL" indicates that the volume is a secondary volume. "EMPTY" indicates that the volume is in an as-yet unused state.

FIG. 22 shows a table structure for the external volume table 621. The external volume table 621 holds information necessary for virtualizing storage resources in the possession of a plurality of respective storage apparatus 101 into a single storage resource. The external volume table 621 correlates a VOL-ID1201, external port-ID1202, IP address 1203, and external VOL-ID1204 with respective virtual volumes 631.

The VOL-ID1201 indicates an ID for identifying a virtual volume 631 within virtualizing apparatus 105.

The external port-ID1202 indicates an ID for identifying a port (external connection port belonging to the virtualizing apparatus 105) for transferring I/O requests from the host computer 104 to the virtual volume 631 to an external volume.

The IP address 1203 indicates an IP address for identifying storage apparatus 101 belonging to the external volume. WWN (World Wide Name) may also be used as information for identifying the storage apparatus 101 having an external volume.

External VOL-ID1204 indicates an ID (ID 801 held in volume table 421) for identifying an external volume within the storage apparatus 101.

FIG. 23 shows an example of a tier production screen 1301 for defining storage tiers. The tier production screen 1301 is displayed at the storage management server 102 or the management client 103. The user then designates storage tier names and tier conditions while referring to the tier production screen 1301. For example, it is possible to select a combination of one or more from "capacity", "apparatus name", "apparatus type", "RAID level" and "disc type". After the user designates the storage tiers and the tier conditions, it is possible to make a storage tier by clicking a confirm button.

FIG. 24 shows an example of a selection screen 1401 for deleting virtual allocation of virtually allocated volumes. The selection screen 1401 is displayed at the storage management server 102 or the management client 103. When an empty volume exists in a virtual allocation destination storage tier, processing is necessary to delete the virtual allocation of a virtually allocated volume. In the event that a plurality of volumes it is possible to delete virtual allocation of exist, it is possible for the user to instruct a volume to delete a virtual allocation by selecting which of the volumes the virtual allocation is to be deleted for and clicking a confirm button displayed at the selection screen 1401.

Figure 28:
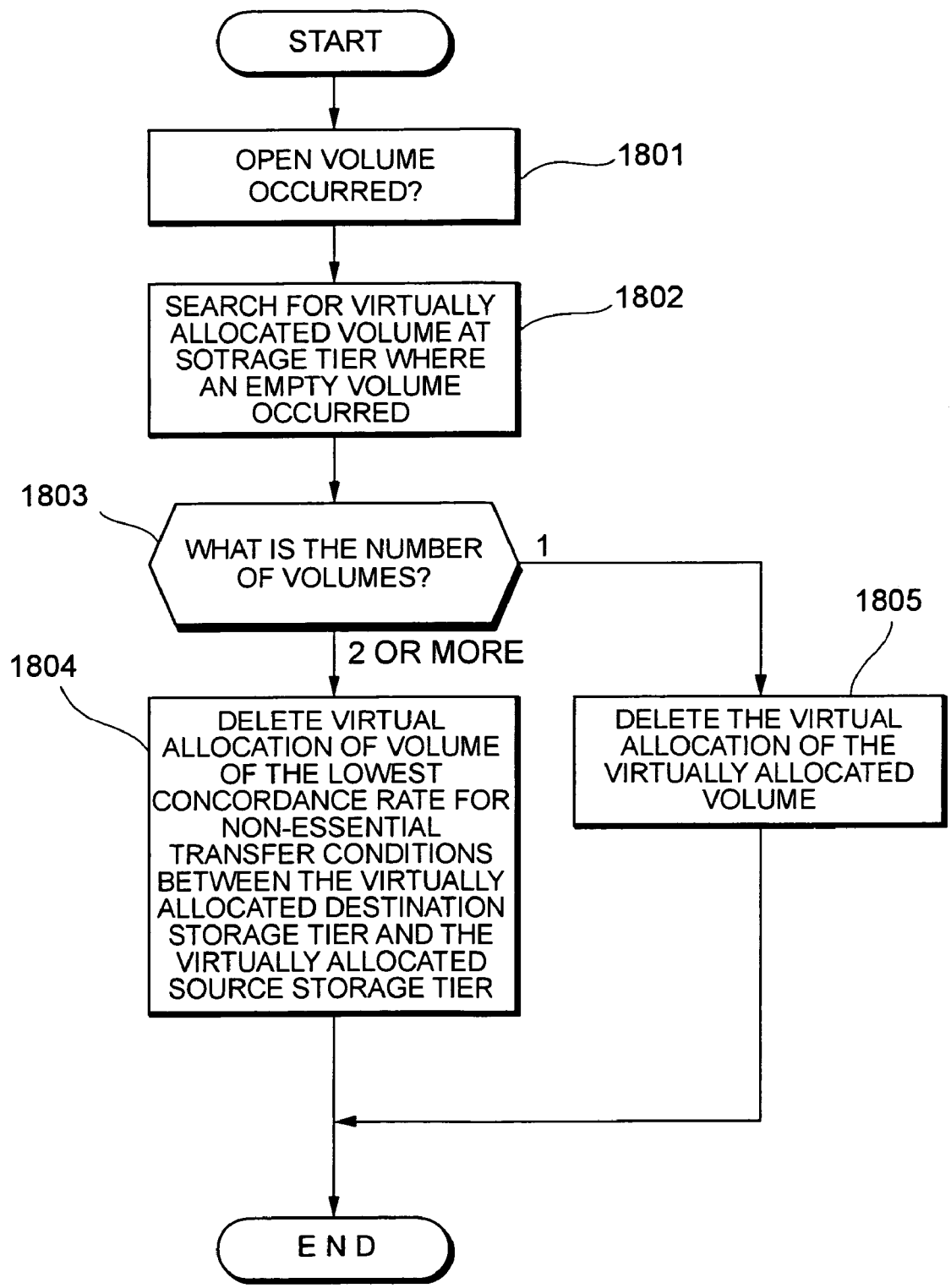
FIG. 28 is a flowchart showing processing for automatically deleting virtual allocation of a volume.

A configuration is also possible where the storage management server 102 automatically deletes virtual allocation of a volume. For example, storage management server 102 automatically deletes virtual allocation of volumes based on the "time of day" relocation or replication of the volume is executed, or on the operation type ("relocation" or "replication"). The details of a process where the storage management server 102 deletes virtual allocations of a volume automatically is described in the following (FIG. 28).

Figure 25:
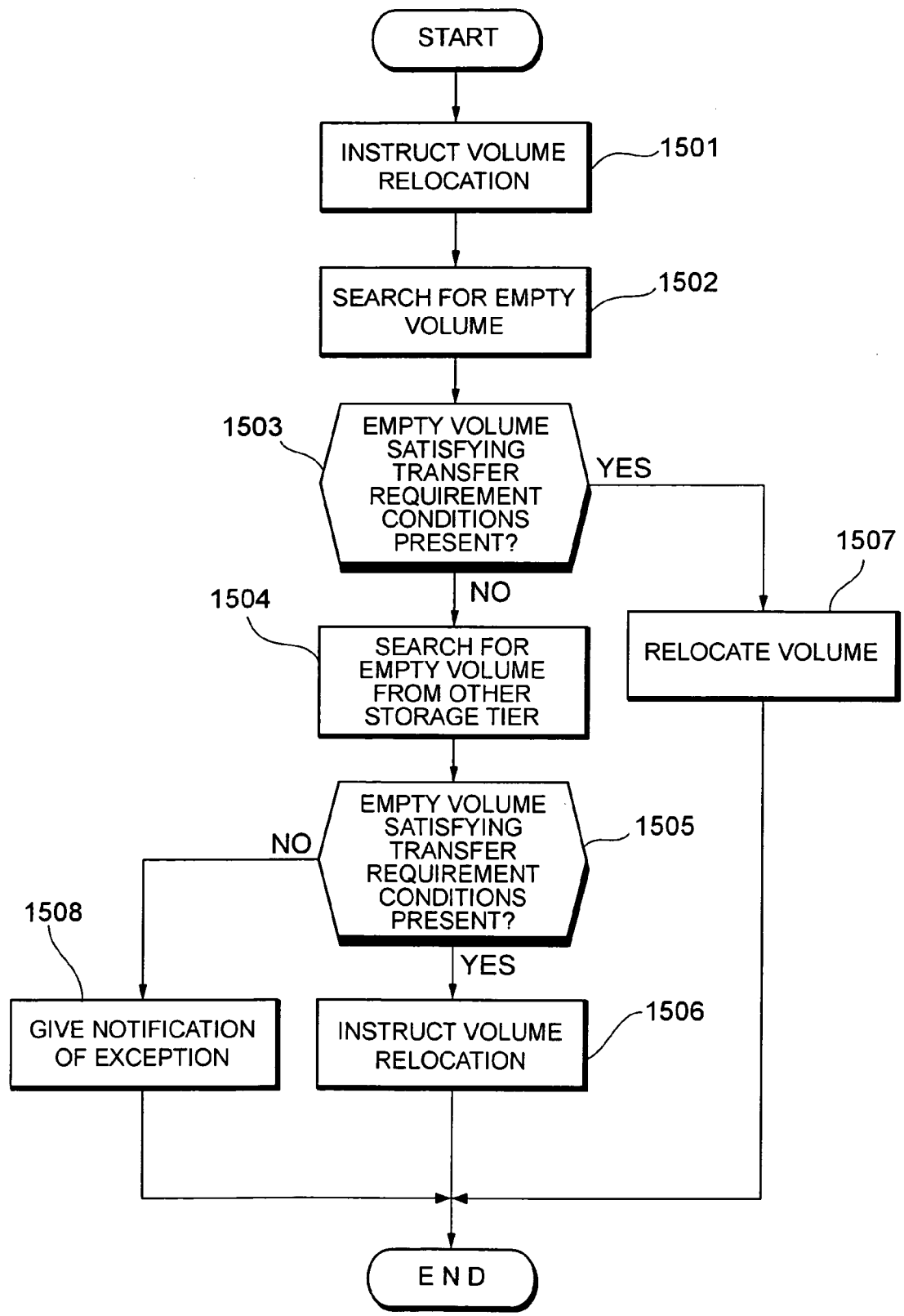
FIG. 25 is a flowchart showing an overall outline of a volume relocation process.

FIG. 25 is a flowchart showing an overall outline of a volume relocation process. First, a user designates a volume to be relocated from a plurality of volumes registered in the volume table 421, selects a storage tier constituting a transfer destination for this volume from the storage tier table 422 and instructs relocation of the volume (step S1501). At this time, it is possible to designate relocation of a grouped plurality of volumes collectively.

The storage management server 102 searches for an empty volume satisfying the transfer requirement conditions at the storage tier of the transfer destination designated by the user from the volume table 421 (step 1502).

The storage management server 102 then determines whether or not the empty volume is an empty volume satisfying the transfer requirement conditions at the storage tier of the transfer destination designated by the user from the volume table 421 (step 1503).

If an empty volume satisfying the transfer requirement conditions does exist (step 1503: YES), the storage management server. 102 instructs the storage apparatus 101 to transfer the volume to this empty volume (step 1507).

If an empty volume satisfying the transfer requirement conditions does not exist (step 1503: NO), a search is made to see if an empty volume satisfying the transfer requirement conditions exists in another storage tier (step 1504), and it is determined whether or not an empty volume satisfying the transfer requirement conditions exists (step 1505).

If an empty volume satisfying the transfer requirement conditions does exist in another storage tier (step 1505: YES), the storage management server 102 virtually allocates this empty volume to the storage tier designated as the transfer destination by the user, and the storage apparatus 101 is instructed to relocate the volume to the empty volume (step 1506).

If an empty volume satisfying the transfer requirement conditions does not exist in another storage tier (step 1505: NO), the storage management server 102 notifies the user of the exception (step 1508).

Figure 26:
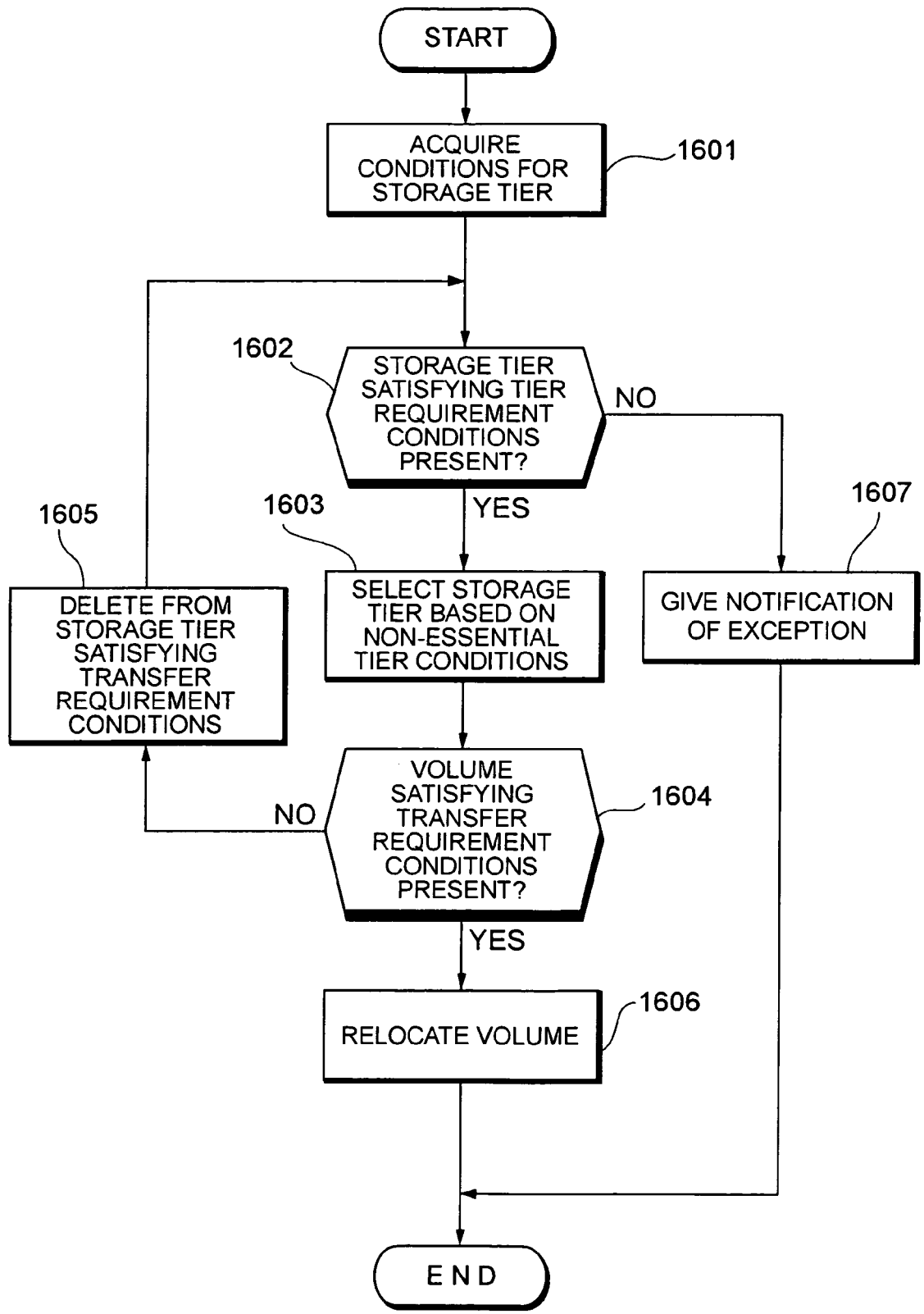
FIG. 26 is a flowchart showing processing for searching for volumes satisfying transfer requirement conditions.

FIG. 26 is a flowchart showing processing for searching for a free volume satisfying the transfer requirement conditions from another storage tier in the event that a volume satisfying the transfer requirement conditions does not exist in the storage tier of the transfer destination. This search processing corresponds to steps 1504 and 1505 described above.

First, the storage management server 102 acquires tier conditions relating to the storage tier the user has designated as the transfer destination from the storage tier table 422 (step 1601).

The storage management server 102 makes the required tier conditions based on tier conditions acquired in step 1601 and searches as to whether of not a storage tier satisfying the required tier conditions is present (step 1602). The "required tier conditions" refers to required conditions to be satisfied by storage tiers volumes are virtually allocated to that constitute sources. For example, capacity conditions (storage capacity or number of empty volumes etc.) can be given as required tier conditions. For example, in the case where the storage capacity of a storage tier of a transfer destination designated by a user is 100 GB or more, a storage tier having a storage capacity of less than 100 GB is not selected as a storage tier constituting a source that is virtually allocated as a volume.

If a storage tier satisfying the required tier conditions does not exist (step 1602: NO), the storage management server 102 gives notification of the exception (step 1607).

In the event that a storage tier satisfying the required tier conditions exists (step 1602: YES), a storage tier having tier conditions that are the closest to the storage tier of the original transfer destination is selected from a plurality of storage tiers satisfying the required tier conditions based non-essential tier conditions (step 1603). Non-essential tier conditions refers to conditions, (for example, "apparatus ID", "apparatus type", "RAID level" and "disc type" etc.), other than the required tier conditions of the tier conditions. It is then possible to select storage tier conditions having tier conditions close to the storage tier of the original transfer destination by setting weightings to the non-essential tier conditions in advance. What kind of weightings are assigned to the respective non-essential tier conditions is based on policy. For example, in the event that a policy is set where the transfer source volume and the transfer destination volume are to exist within the same storage apparatus, the weighting for "apparatus ID" is set to be large, and the weighting for other non-essential tier conditions is set to be small.

The storage management server 102 then determines whether or not the empty volume is an empty volume satisfying the transfer requirement conditions at the storage tier in step 1603 (step 1604).

If an empty volume satisfying the transfer request conditions exists (step 1604: YES), this empty volume is virtually allocated to the transfer destination storage tier, and volume relocation is executed (step 1606).

If an empty volume satisfying the transfer requirement conditions does not exist (step 1604: NO), the storage tier selected in step 1603 is deleted from storage tiers satisfying the transfer requirement conditions (step 1605), and step 1602 is returned to.

Figure 27:
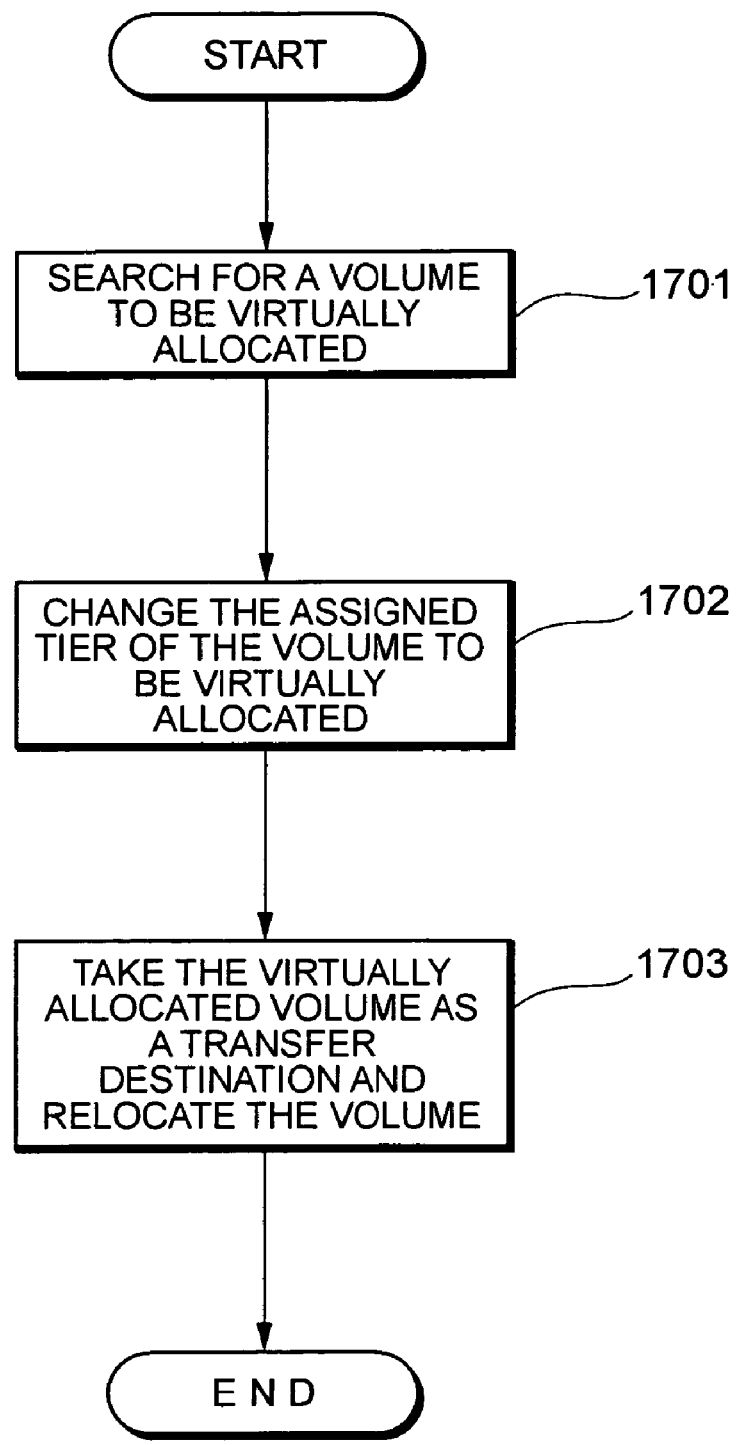
FIG. 27 is a flowchart showing processing executing volume relocation taking a virtually allocated volume as a transfer destination.

FIG. 27 is a flowchart showing processing executing volume relocation taking a virtually allocated volume as a transfer destination. This volume relocation execution processing corresponds to the processing of step 1606.

First, storage management server 102 searches for an ID for a volume to be virtually allocated from the volume table 421 (step 1701).

Next, storage management server 102 updates the volume table 421 in such a manner that assigned tier 808 of the volume to be virtually allocated is virtually allocated so as to become the assigned tier (1702).

Next, the storage management server 102 designates relocation of the volume to the storage apparatus 101 taking the virtually allocated volume as the transfer destination and updates "virtual allocation destination storage tier" "transfer time of day", and "operation" of tier transfer information table 424 of the tier transfer information table 424 (step 1703).

FIG. 28 is a flowchart showing processing for automatically deleting virtual allocation of a volume. First, an empty volume is generated at the storage tier of the virtually allocated destination (step 1801). For example, the storage management server 102 detects generation of an empty volume by periodically checking the volume table 521 of each storage apparatus 101.

Next, the storage management server 102 searches for a volume where "virtually allocated destination storage tier" from within the tier transfer information table 424 matches with the storage tier the empty volume detected in step 1801 belongs to (step 1802).

The storage management server 102 then checks whether one or more volumes searched in step 1802 have been retrieved (step 1803).

If the number of volumes retrieved in step 1802 is one, the storage management server 102 deletes the virtual allocation for the virtually allocated volume (step 1805).

If the number of volumes retrieved in step 1802 is two or more, the storage management server 102 deletes the virtual allocation of the volume for which the rate of concordance is the lowest for the non-essential conditions for transfer between the virtually allocated destination storage tier and the virtually allocated source storage tier (step 1804). The method for selecting a volume for which virtual allocation is to be deleted may be selection of a volume for a virtual allocation deletion target based on, for example, type of operation (relocation or replication) or selection of a volume for which the transfer time of day is the oldest (or newest) as a volume taken as a target for deletion of virtual allocation. Further, with these selection methods, the rate of concordance of non-essential conditions for transfer between the virtually allocated destination storage tier and the virtually allocated source storage tier may also be added for these selection methods.

Further, in the event that an empty volume does occur in the storage tier of the virtual allocation destination, the virtual allocation is deleted on the condition that the rate of concordance of the non-essential conditions for transfer in the possession of this empty volume and the non-essential conditions for transfer in the possession of the volume virtually allocated to the virtually allocated storage tier is a predetermined value or more, and that the volume of the transfer source is relocated to this empty volume in advance.

Figure 29:
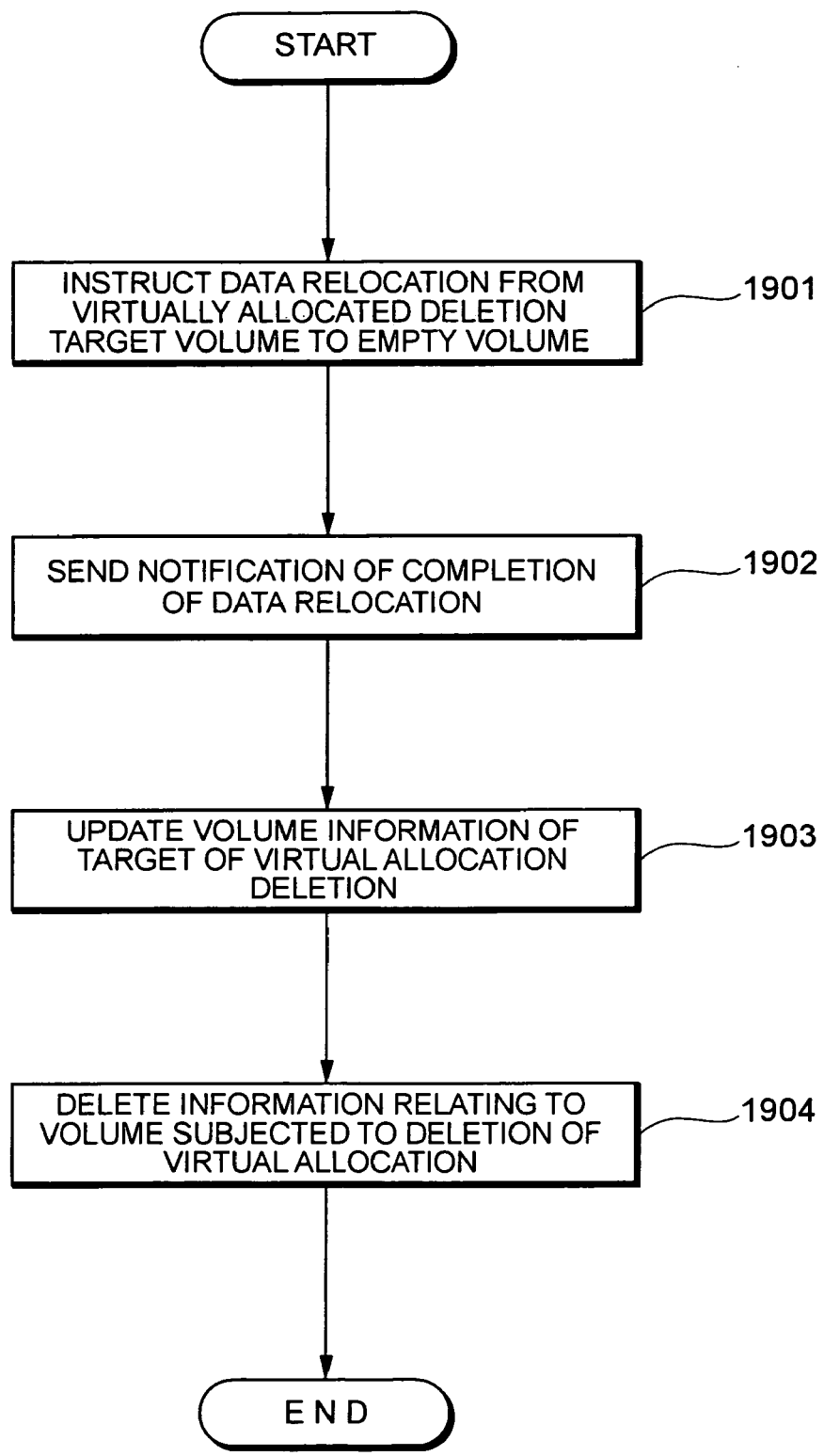
FIG. 29 is a flowchart showing processing for deleting virtual allocation of a volume and relocating the volume.

FIG. 29 is a flowchart showing a process for deleting virtual allocation of a volume virtually allocated in order to perform volume relocation for return to a virtually allocated source storage tier, and relocating data for a volume of the target for virtual allocation deletion in an empty volume.

First, storage management server 102 instructs the storage apparatus 101 to relocate data from the virtually allocated volume that is the target of deletion to an empty volume (step 1901).

In doing so, the storage apparatus 101 executes volume relocation based in an instruction from the storage management server 102 and sends notification of completion of relocation to the storage management server 102 (step 1902).

The storage management server 102 changes the attribute deletion 808 of the volume of the target of virtual allocation deletion with the virtually allocated source storage tier for the volume table 421, and updates the usage state 807 of the empty volume to "in use" (step 1903).

The storage management server 102 then deletes information relating to the volume deletion of virtual allocation that was carried out for from the tier transfer information table 424 (step 1904).

Figure 30:
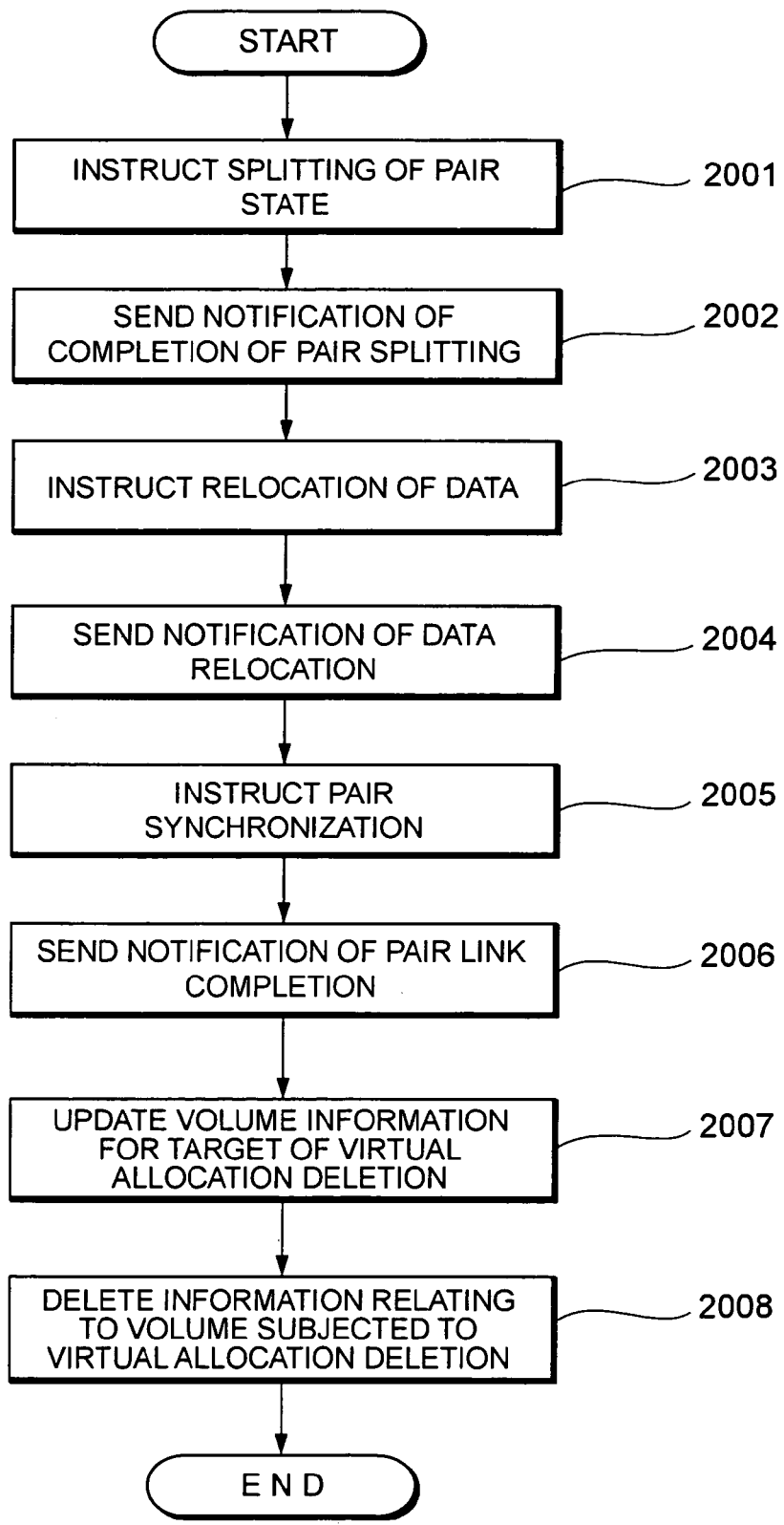
FIG. 30 is a flowchart showing processing for deleting virtual allocation of a volume and making a replication for the volume.

FIG. 30 is a flowchart showing a process for deleting virtual allocation of a volume virtually allocated in order to make a replication for return to a virtually allocated source storage tier, and relocating data for a volume of the target of virtual allocation deletion in an empty volume.

First, storage management server 102 instructs storage apparatus 101 that a pair state between the volume for the target of virtual allocation deletion and the primary volume has been split (step 2001). At this time, the storage management server 102 may send a split instruction to the storage apparatus 101 in possession of the volume of the target of virtual allocation deletion or may send a split instruction to the storage apparatus 101 in possession of the primary volume.

In doing so, the storage apparatus 101 sends notification of completion of the pair split to the storage management server 102 (step 2002).

Next, storage management server 102 instructs the storage apparatus 101 to relocate data from the target of virtual allocation deletion to an empty volume (step 2003).

In doing so, the storage apparatus 101 relocates data from the volume that is the target of virtual allocation deletion to the empty volume and sends notification of completion of data relocation to the storage management server 102 (step 2004). The empty volume then becomes a secondary volume as a result of data relocation.

Next, the storage management server 102 sends an instruction for re-synchronizing (pair sync) the pair state between the primary volume and the secondary volume to the storage apparatus 101 (step 2005).

In doing so, the storage apparatus 101 manages differential data between the primary volume and the secondary volume, sends only differential data from the primary volume to the secondary volume, resynchronizes the pair state between both parties, and sends notification of completion of pair re-synchronization to the storage management server 102 (step 2006). In the event that it is guaranteed that differential data does not exist between the primary volume and the secondary volume as a result of the primary volume being write-inhibited, etc., data transfer from the primary volume to the secondary volume is unnecessary.

The storage management server 102 changes the attribute deletion 808 of the volume of the target of virtual allocation deletion with the virtually allocated source storage tier for the volume table 421, and updates the usage state 807 of the empty volume to "in use" (step 1903).

The storage management server 102 then deletes information relating to the volume deletion of virtual allocation that was carried out for from the tier transfer information table 424 (step 2008).

According to this embodiment, volume relocation or replication can be appropriately executed even when an empty volume does not exist in a storage tier designated as a transfer destination or replication destination of a volume.

Second Embodiment

Next, a description is given of processing for relocating a certain volume to another volume, and processing for replication of a certain volume to this other volume. In the first embodiment described above, storage tiers are designated as a relocation destination or replication destination for a volume, but in the second embodiment, a volume is designated as a relocation destination or replication destination for a volume.

Figure 31:
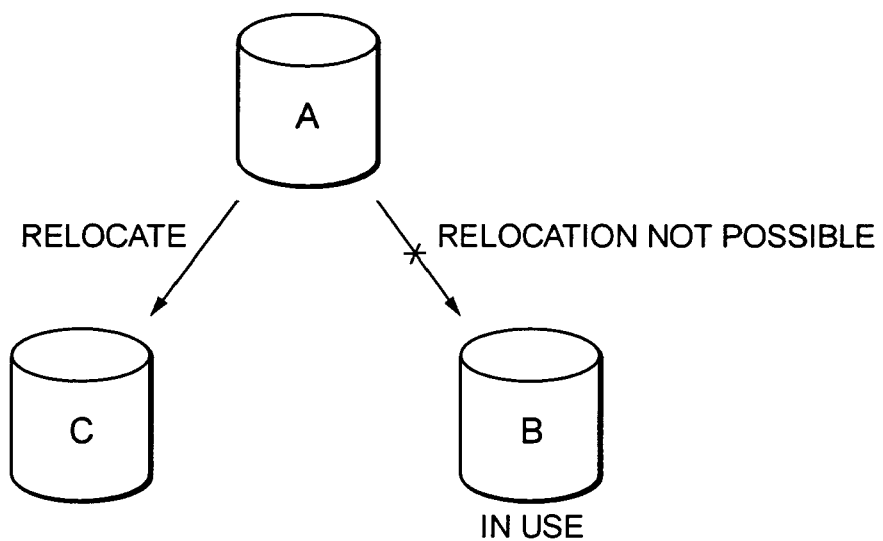
FIG. 31 is a view illustrating an outline of processing for relocating a volume.
Figure 32:
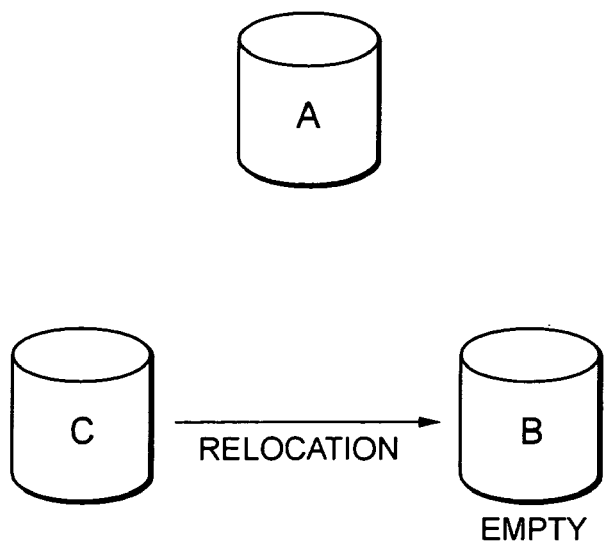
FIG. 32 is a further view illustrating an outline of processing for relocating a volume.

First, a description is given with reference to FIG. 31 and FIG. 32 of processing for relocating volume A to volume B.

As shown in FIG. 31, when an instruction to relocate volume A to volume B is provided by a user, the storage management server 102 checks whether or not volume B is an empty volume satisfying the transfer requirement conditions. The transfer requirement conditions can be said to be essential conditions required of a volume for a transfer destination, for example, "a transfer destination volume is a volume having storage capacity of greater than the capacity of the transfer source volume, and is a volume that has not yet been used". In the event that volume B satisfies the transfer requirement conditions, the storage management server 102 instructs relocation of volume A to volume B.

In the event that volume B does not satisfy the transfer requirement conditions, the storage management server 102 searches for an empty volume satisfying the transfer requirement conditions from within the other volumes. Here, the case where volume C satisfies the transfer requirement conditions is considered. The storage management server 102 sets volume C as the virtual transfer destination, and instructs the storage apparatus 101 to relocate volume A at volume C. The storage apparatus 101 then relocates volume A at volume C.

After this, as shown in FIG. 32, the case is considered where volume B that is the original transfer destination subsequently satisfies the transfer requirement conditions. The storage apparatus 101 then automatically relocates the data of volume C to volume B. The storage management server 102 then notifies the user that the volume B that is the original transfer destination subsequently satisfies the transfer requirement conditions, instructions from the user are awaited, and the storage apparatus 101 relocates the data of volume C on the volume B.

The storage management server 102 then deletes setting of the volume A as a virtual transfer destination for volume C.

Figure 33:
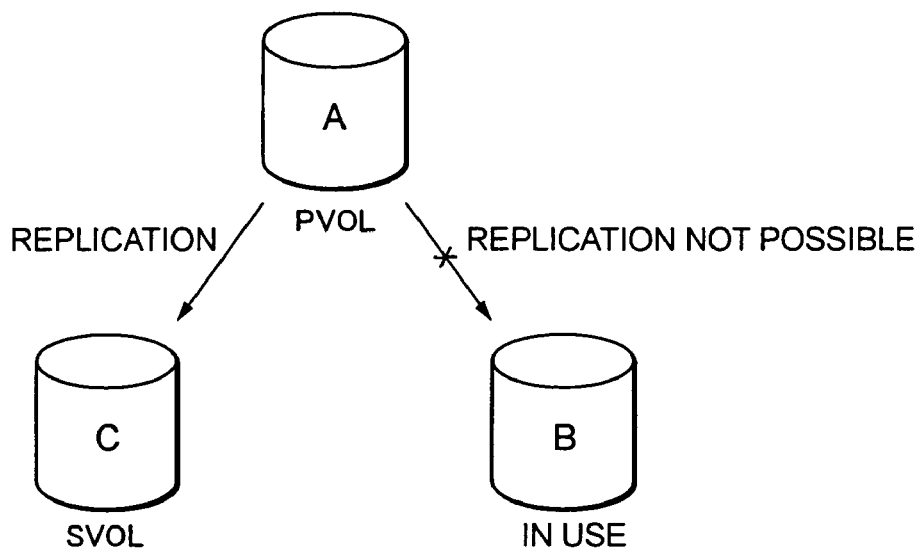
FIG. 33 is another view illustrating an outline of processing for replicating a volume.
Figure 34:
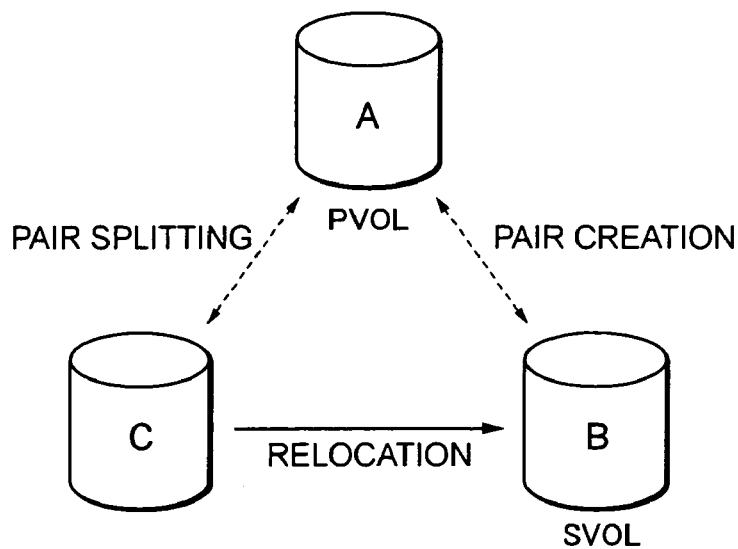
FIG. 34 is a further view illustrating an outline of processing for replicating a volume.

Next, a description is given with reference to FIG. 33 and FIG. 34 of an outline of processing for making a replication of volume A at volume B.

As shown in FIG. 33, when an instruction to make a replication of volume A on volume B is provided by a user, the storage management server 102 checks whether or not volume B is an empty volume satisfying the replication requirement conditions. The replication requirement conditions can be said to be essential conditions required of the secondary volume, for example, "a secondary volume is a volume having storage capacity of greater than the capacity of the primary volume, and is a volume that has not yet been used". In the event that volume B satisfies the replication requirement conditions, the storage management server 102 instructs the storage apparatus 101 to make a replication of volume A at volume B.

In the event that volume B does not satisfy the replication requirement conditions, the storage management server 102 searches for an empty volume satisfying the replication requirement conditions from within the other volumes. Here, the case where volume C satisfies the replication requirement conditions is considered. The storage management server 102 sets volume C as the virtual replication destination, and instructs the storage apparatus 101 to make a replication of the volume A at the volume C. The storage apparatus 101 then makes a replication of volume A at volume C. The storage management server 102 the sets the pair state between volumes A and C to a synchronized state.

After this, as shown in FIG. 34, the case is considered where volume B that is the original replication destination subsequently satisfies the replication requirement conditions. The storage apparatus 101 splits the pair state between volume A and volume C, and automatically relocates the data of volume C to the volume B. The storage management server 102 may also then notify the user that the volume B that is the original replication destination subsequently satisfies the replication requirement conditions, await instructions from the user, and the storage apparatus 101 may split the pair state of volume A and volume C, and relocate the data of volume C to volume B.

The storage management server 102 the sets the pair state between volume A and volume B to a synchronized state, and releases setting of volume A as a virtual transfer destination with respect to volume C.

Next, an additional description is given with reference to FIG. 35 to FIG. 38 of the details of the volume relocation processing and replication making processing. In these processes, description is simplified for points that overlap with the first embodiment, and the description centers on the points of distinction between the first embodiment and the second embodiment.

Figure 35:
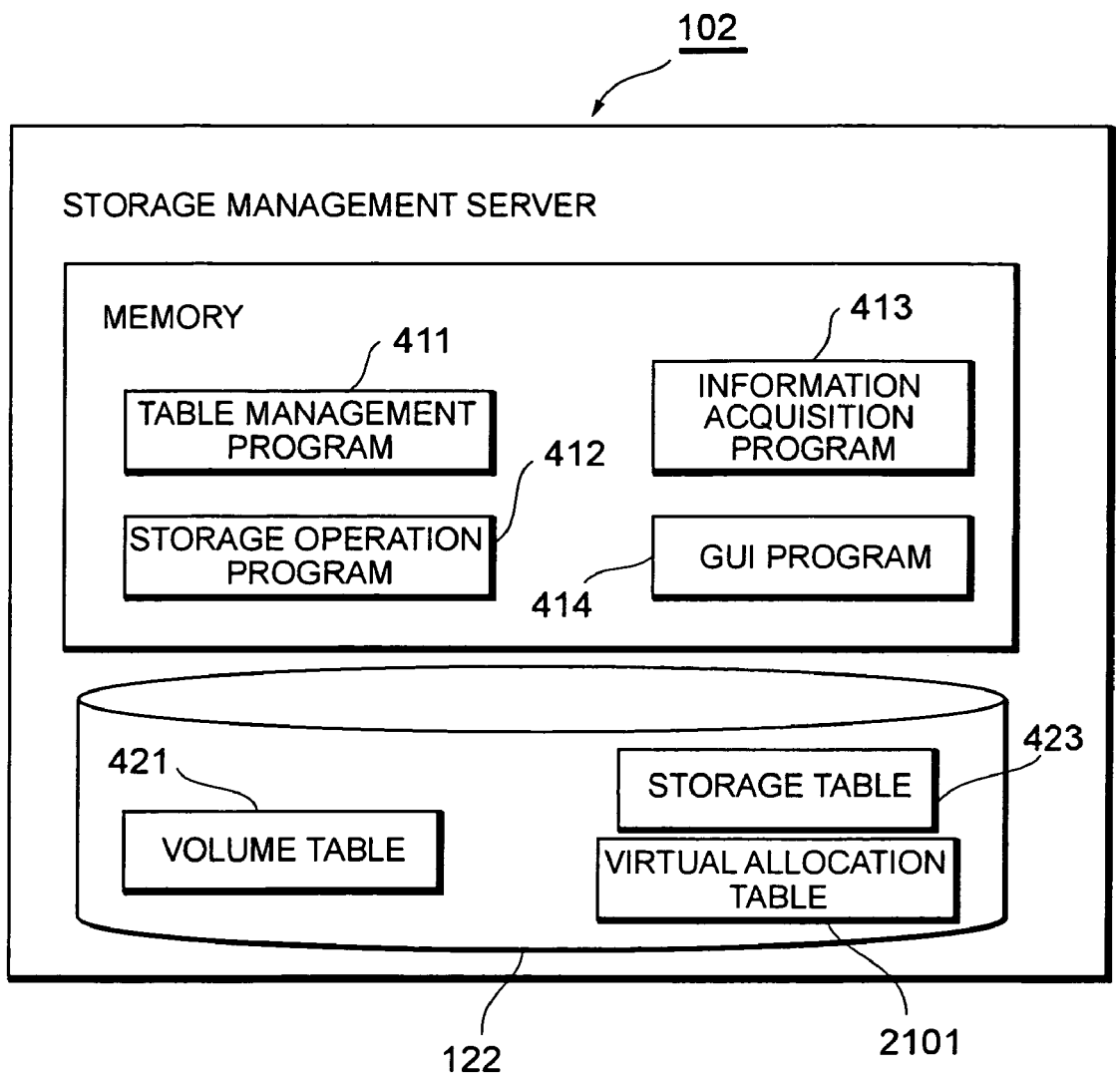
FIG. 35 is a view of a configuration for functions of a storage management server.

FIG. 35 shows a functional configuration for the storage management server. A point of difference of the functional configuration shown in the same drawing with the functional configuration of FIG. 14 is that the storage tier table 422 and the tier transfer information table 424 are not stored in the storage apparatus 122 but a virtual allocation table 2101 is stored.

FIG. 36 shows a table configuration for the virtual allocation table 2101. The virtual allocation table 2101 holds information relating to virtual allocation of a volume. The virtual allocation table 2101 correlates ID2201, VOL-ID2202, transfer destination 2203, virtual transfer destination 2204, transfer time of day 2205 and operation 2206.

ID 2201 is an ID for identifying virtual allocation information.

VOL-ID2202 indicates an ID (ID 801 held in volume table 421) for identifying a volume.

The transfer destination 2203 indicates an ID (ID801 held in the volume table 421) for identifying the volume designated as the original transfer destination (or replication destination).

The virtual transfer destination 2204 indicates an ID (ID801 held in the volume table 421) for identifying the volume designated as the virtual transfer destination (or virtual replication destination).

The transfer time of day 2205 indicates the time of day a volume relocation operation or replication operation is carried out.

Operation 2206 indicates information ("relocation" or "replication") relating to a volume operation.

For example, virtual allocation information of ID "002" indicates that "the volume having VOL-ID"033" was originally to be relocated to the volume having VOL-ID"001" and is relocated to the volume having VOL-ID "005"".

However, virtual allocation information of ID "001" indicates that "the volume having VOL-ID"010" was originally to be relocated to the volume having VOL-ID"003" and is relocated to the volume (i.e. an own volume) having VOL-ID "010"". This means that a transfer source or replication source of a volume is transferred to itself (i.e. data is not transferred) in the event that volume relocation or replication production is instructed but a volume satisfying the transfer requirement conditions or replication requirement conditions does not exist.

Figure 37:
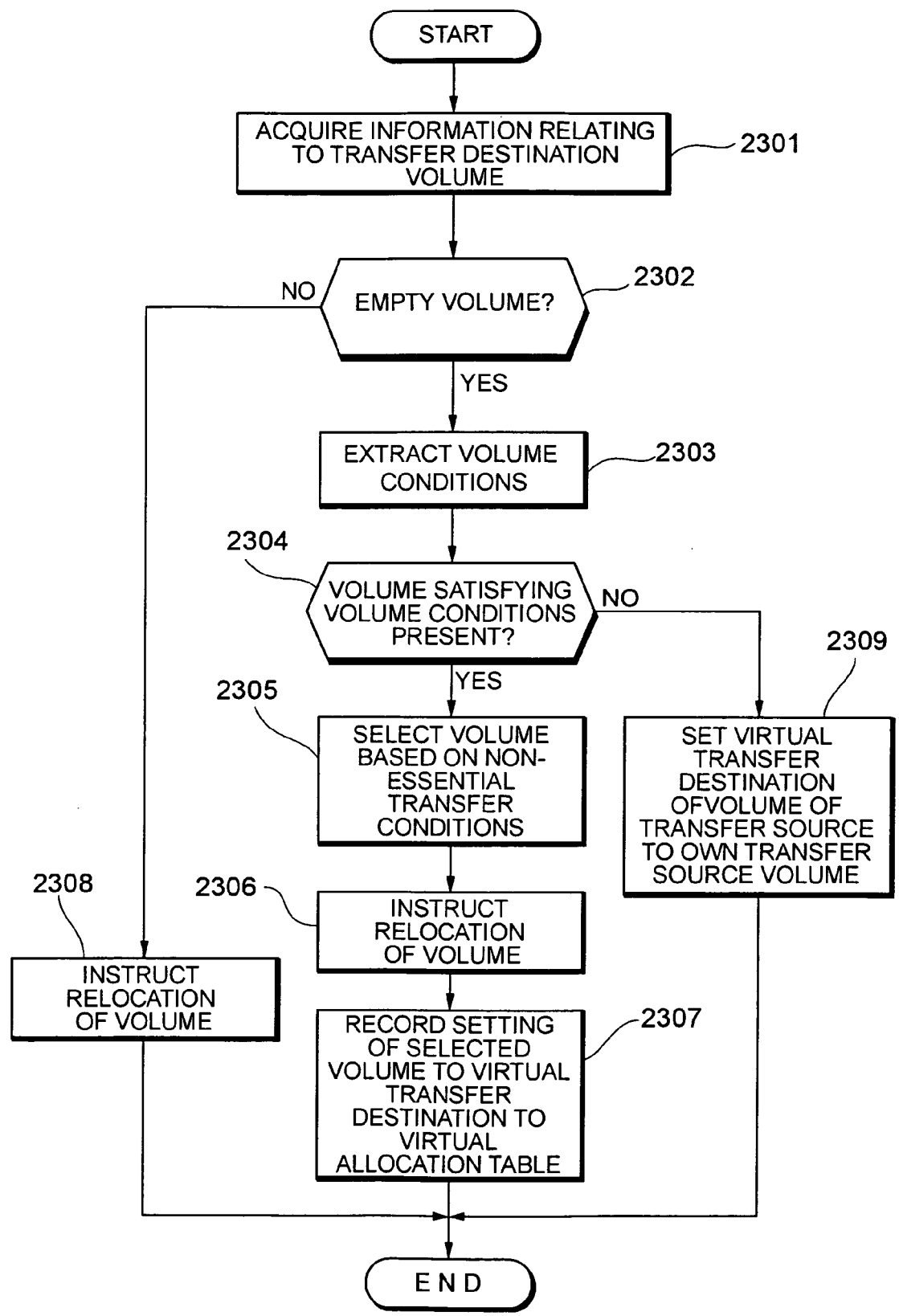
FIG. 37 is a flowchart showing processing for relocating a volume.

FIG. 37 is a flowchart showing an overall outline of a volume relocation process. First, when in instruction to relocate a certain volume on another volume is received by the user, the storage management server 102 acquires information (usage state 807) relating to the volume designated as the transfer destination from the volume table 421 (step 2301).

The storage management server 102 then confirms the usage state 807 of the volume, and checks whether or not the volume designated as the transfer destination is an empty volume (step 2302).

If the volume designated as the transfer destination is an empty volume (step 2302: YES), the storage management server 102 instructs the storage apparatus 101 to relocate the volume (step 2308).

If the usage state 807 of the volume designated as the transfer destination is "in use" or "SVOL" rather than "empty" (step 2302: NO), the conditions (hereinafter referred to as volume conditions) for the volume designated as the transfer destination are extracted from the volume table 421

(step 2303). It is possible to include, for example, "RAID level", "disc type", and "capacity" in the volume conditions.

The storage management server 102 makes transfer requirement conditions based on the volume conditions and searches to see if a volume satisfying the transfer requirement conditions exists (step 2304). For example, "capacity" is included in the transfer requirement conditions. If the policy is for the transfer source volume and the transfer destination volume to exist within the same storage apparatus, it is possible to include "capacity" and "storage ID" in the transfer requirement conditions.

In the event that a volume satisfying the transfer requirement conditions does not exist (step 2304: NO), the storage management server 102 sets the virtual transfer destination of the volume of the transfer source to the transfer source volume itself (step 2309).

If a volume satisfying the transfer requirement conditions exists (step 2304: YES), the storage management server 102 selects a volume having non-essential conditions for transfer that are the closest to the non-essential conditions for transfer of the transfer destination volume from within the plurality of volumes satisfying the transfer requirement conditions (step 2305).

The storage management server 102 then sets the selected volume as a virtual transfer destination, and instructs the relocation of the volume to the storage apparatus 101 (step 2306).

The storage management server 102 then registers setting of the selected volume as a virtual transfer destination in the virtual allocation table 2101 (step 2307).

It is also possible to plan to relocate data automatically to the volume taken as the original transfer destination from the volume taken as the virtual transfer destination at the time where the volume taken as the original transfer destination subsequently becomes the empty volume, or communicate to the user that the volume taken as the original transfer destination is an empty volume, await instructions from the user, and relocate data from the volume taken as the virtual transfer destination on the volume taken as the original transfer destination.

Figure 38:
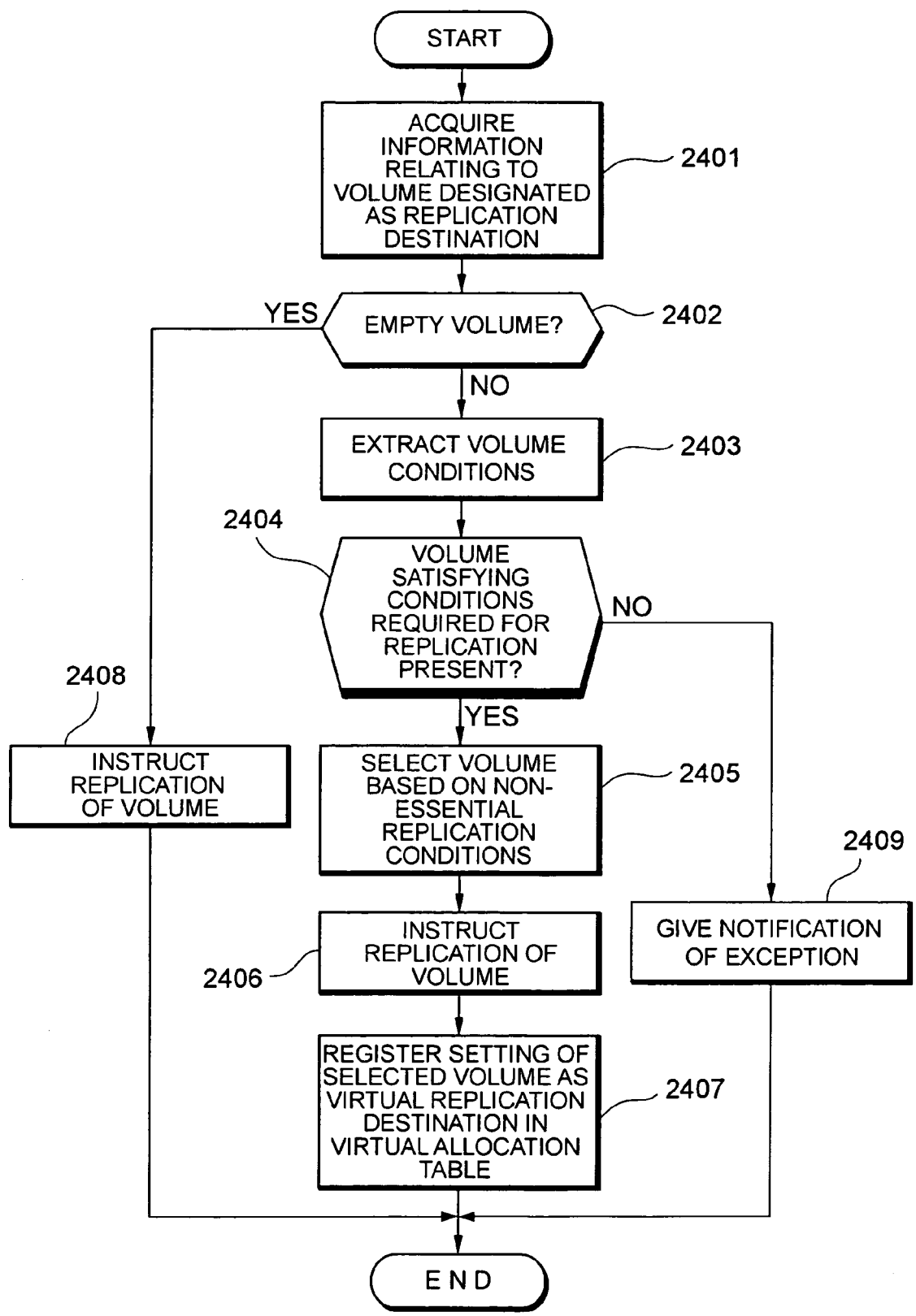
FIG. 38 is a flowchart showing processing for replicating a volume.

FIG. 38 is a flowchart showing processing for making a replication of a volume. First, when in instruction to make a replication of a certain volume on another volume is received by the user, the storage management server 102 acquires information (usage state 807) relating to the volume designated as the replication destination from the volume table 421 (step 2401).

The storage management server 102 then confirms the usage state 807 of the volume, and checks whether or not the volume designated as the replication destination is an empty volume (step 2402).

If the volume designated as the replication destination is an empty volume (step 2402: YES), the storage management server 102 instructs the storage apparatus 101 to make a replication of the volume (step 2308).

If the usage state 807 of the volume designated as the replication destination is "in use" or "SVOL" rather than "empty" (step 2402: NO), the volume conditions for the volume designated as the replication destination are extracted from the volume table 421 (step 2403).

The storage management server 102 makes replication requirement conditions based on the volume conditions and searches to see if a volume satisfying the replication requirement conditions exists (step 2404). For example, "capacity" is included in the replication requirement conditions. If the policy is for the replication source volume and the replication destination volume to exist within the same storage apparatus, it is possible to include "capacity" and "storage ID" in the replication requirement conditions.

In the event that a volume does not satisfy the replication requirement conditions (step 2404: NO), the storage management server 102 gives notification of the exception (step 2409).

If a volume satisfying the replication requirement conditions exists (step 2404: YES), the storage management server 102 selects a volume having non-essential conditions for replication that are the closest to the non-essential conditions for replication of the replication destination volume from within the plurality of volumes satisfying the replication requirement conditions (step 2405).

The storage management server 102 then sets the selected volume as a virtual replication destination, and instructs making of a replication of the volume to the storage apparatus 101 (step 2406).

The storage management server 102 then registers setting of the selected volume as a virtual replication destination in the virtual allocation table 2101 (step 2407).

It is also possible to plan to relocate data automatically to the volume taken as the original replication destination from the volume taken as the virtual replication destination at the time where the volume taken as the original replication destination subsequently becomes the empty volume, or communicate to the user that the volume taken as the original replication destination is an empty volume, await instructions from the user, and relocate data from the volume taken as the virtual replication destination on the volume taken as the original replication destination.

Further, according to this embodiment, volume relocation or replication can be appropriately executed even when a volume designated as a transfer destination or replication destination of a volume is not an empty volume.

What is claimed is:

1. A storage system having storage resources containing a plurality of storage tiers, each including one or more volumes, the storage system comprising:
   a virtual allocation section for virtually allocating a third volume satisfying transfer requirement conditions of volumes belonging to a third storage tier to a second storage tier in the event that a second volume satisfying the transfer requirement conditions that is a transfer destination of a first volume does not exist in the second storage tier when relocating the first volume belonging to a first storage tier to the second storage tier; and
   a relocation section for relocating the first volume to the third volume.

2. The storage system according to claim 1, wherein when a volume of volumes belonging to the second storage tier subsequently becomes a second volume satisfying the transfer requirement conditions, the relocation section relocates the third volume to the second volume.

3. The storage system according to claim 1, wherein the virtual allocation section searches for a volume satisfying the transfer requirement conditions from volumes belonging to the third storage tier and searches for the third volume from the volumes satisfying the transfer requirement conditions based on non-essential conditions for transfer.

4. The storage system according to claim 1, wherein the virtual allocation section searches for a volume satisfying the transfer requirement conditions from volumes belonging to the third storage tier and searches for the third volume having non-essential conditions for transfer that most closely match the non-essential conditions for transfer of the second volume from the volumes satisfying the transfer requirement conditions.

5. The storage system according to claim 2, wherein when a volume of the volumes belonging to the second storage tier subsequently becomes a second volume satisfying the transfer requirement conditions, in the event that a plurality of third volumes exist, the relocation section relocates a volume of the plurality of third volumes with the lowest rate of concordance of non-essential conditions for transfer between the second storage tier and the third storage tier to the second volume.

6. The storage system as disclosed in claim 1, wherein the transfer requirement conditions are that the capacity of the transfer destination volume is equal to or greater than the capacity of the transfer source volume.

7. The storage system according to claim 3, wherein the transfer conditions are either of identification information for the storage apparatus supplying the volume, type of storage apparatus supplying the volume, RAID level of the volume, or type of storage apparatus supplying the volume.

8. A storage system having storage resources containing a plurality of storage tiers, each including one or more volumes, the storage system comprising:
  a virtual allocation section for virtually allocating a third volume satisfying replication requirement conditions of volumes belonging to a third storage tier to a second storage tier in the event that a second volume satisfying the replication requirement conditions that is a replication destination of a first volume does not exist in the second storage tier when replicating the first volume belonging to a first storage tier to the second storage tier; and
  a replication section for replicating the first volume to the third volume.

9. The storage system according to claim 8, wherein when a volume of volumes belonging to the second storage tier subsequently becomes a second volume satisfying the replication requirement conditions, the replication section replicates the third volume at the second volume.

10. The storage system according to claim 8, wherein the virtual allocation section searches for a volume satisfying the replication requirement conditions from volumes belonging to the third storage tier and searches for the third volume from the volumes satisfying the replication requirement conditions based on non-essential conditions for replication.

11. The storage system according to claim 1, wherein the virtual allocation section searches for a volume satisfying the replication requirement conditions from volumes belonging to the third storage tier and searches for the third volume having non-essential conditions for replication that most closely match the non-essential conditions for replication of the second volume from the volumes satisfying the replication requirement conditions.

12. The storage system according to claim 9, wherein when a volume of the volumes belonging to the second storage tier subsequently becomes a second volume satisfying the replication requirement conditions, in the event that a plurality of third volumes exist, the replication section replicates a volume of the plurality of third volumes with the lowest rate of concordance of non-essential conditions for replication between the second storage tier and the third storage tier to the second volume.

13. The storage system as disclosed in claim 8, wherein the replication requirement conditions are that the capacity of the replication destination volume is equal to or greater than the capacity of the replication source volume.

14. The storage system according to claim 10, wherein the non-essential replication requirement conditions is either of identification information for the storage apparatus supplying the volume, type of storage apparatus supplying the volume, RAID level of the volume, or type of storage apparatus supplying the volume.

15. A storage system comprising:
  a plurality of storage apparatus each respectively having one or more volumes, virtualizing apparatus for classifying into a plurality of storage tiers including one or more volumes and virtualizing into a single logical storage resource the plurality of storage apparatus; and
  a storage management server for instructing the storage apparatus to virtually allocate a second empty volume satisfying the capacity conditions within a volume belonging to the third storage tier to a second storage tier and relocating the first volume to the second empty volume in the event that a first empty volume satisfying a capacity condition taking the condition that the storage capacity of the volume of the transfer destination is the storage capacity of the transfer source or more does not exist in the second storage tier when the first volume belonging to the first storage tier is relocated to the second storage tier.

16. The storage system according to claim 15, wherein when a volume of the volumes belonging to the second storage tier subsequently becomes the first empty volume satisfying the capacity conditions, the storage management server instructs the storage apparatus to relocate data relocated at the second empty volume to the first empty volume.

17. A storage system comprising:
  a plurality of storage apparatus each respectively having one or more volumes, virtualizing apparatus for classifying into a plurality of storage tiers including one or more volumes and virtualizing into a single logical storage resource the plurality of storage apparatus; and
  a storage management server for instructing the storage apparatus to virtually allocate a second empty volume satisfying the capacity conditions within a volume belonging to the third storage tier to a second storage tier and replicate the first volume to the second empty volume in the event that a first empty volume satisfying a capacity condition taking the condition that the storage capacity of the volume of the replication destination is the storage capacity of the replication source or more does not exist in the second storage tier when the first volume belonging to the first storage tier is replicated to the second storage tier.

18. The storage system according to claim 17, wherein when a volume of the volumes belonging to the second storage tier subsequently becomes the first empty volume satisfying the capacity conditions, the storage management server instructs the storage apparatus to replicate data replicated at the second empty volume to the first empty volume.

19. A storage system having a plurality of volumes, comprising:
  a virtual allocation section for setting a third volume satisfying transfer requirement conditions as a virtual transfer destination for a first volume in the event that a second volume does not satisfy the transfer requirement conditions when the first volume is relocated to the second volume; and
  a relocation section for relocating the first volume to the third volume.

20. A storage system having a plurality of volumes, comprising:

a virtual allocation section for setting a third volume satisfying replication requirement conditions as a virtual replication destination for a first volume in the event that a second volume does not satisfy the replication requirement conditions when the first volume is replicated to the second volume; and a replication section for replicating the first volume to the third volume.

* * * * *